United States Patent
Koyama

(10) Patent No.: US 9,331,510 B2
(45) Date of Patent: May 3, 2016

(54) PROTECTIVE CIRCUIT, BATTERY CHARGER, AND POWER STORAGE DEVICE

(71) Applicant: Semiconductor Energy Laboratory Co., Ltd., Atsugi-shi, Kanagawa-ken (JP)

(72) Inventor: Jun Koyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 370 days.

(21) Appl. No.: 13/795,243

(22) Filed: Mar. 12, 2013

(65) Prior Publication Data

US 2013/0257354 A1    Oct. 3, 2013

(30) Foreign Application Priority Data

Mar. 28, 2012  (JP) ................. 2012-073411

(51) Int. Cl.
*H02J 7/00*   (2006.01)
(52) U.S. Cl.
CPC ...................... *H02J 7/007* (2013.01)
(58) Field of Classification Search
CPC ............ H02J 7/00; H02J 7/007; H01M 10/42
USPC ..................... 320/107, 118; 429/61
See application file for complete search history.

(56) References Cited

U.S. PATENT DOCUMENTS

| | | | |
|---|---|---|---|
| 5,481,730 A * | 1/1996 | Brown ...................... | G06F 1/26 307/52 |
| 5,617,010 A | 4/1997 | Higashijima et al. | |
| 5,731,856 A | 3/1998 | Kim et al. | |
| 5,744,864 A | 4/1998 | Cillessen et al. | |
| 5,965,998 A * | 10/1999 | Whiting et al. ........... | 320/165 |

(Continued)

FOREIGN PATENT DOCUMENTS

| EP | 1 737 044 A1 | 12/2006 |
|---|---|---|
| EP | 2 226 847 A2 | 9/2010 |

(Continued)

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

(Continued)

*Primary Examiner* — Richard Isla Rodas
*Assistant Examiner* — Dung V Bui
(74) *Attorney, Agent, or Firm* — Fish & Richardson P.C.

(57) ABSTRACT

A low-power protective circuit includes a detection unit that intermittently detects a voltage across a secondary battery; a battery management unit that includes a buffer memory device and a processor and determines, based on a value of the voltage, whether the secondary battery needs to be charged; a switch circuit that establishes or breaks electrical continuity between a host system and the secondary battery; a switch control unit that turns on or off the switch circuit in accordance with the judgment made by the battery management unit; a switch that controls supply of power supply voltage from the secondary battery to the battery management unit; and a power controller that intermittently stops supply of the power supply voltage to the battery management unit by turning off the switch.

21 Claims, 11 Drawing Sheets

(56) References Cited

U.S. PATENT DOCUMENTS

| | | |
|---|---|---|
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,834,590 B2 * | 11/2010 | Genin et al. .............. 320/136 |
| 7,907,902 B2 | 3/2011 | Kato et al. |
| 8,049,469 B2 * | 11/2011 | Kim .............. 320/153 |
| 8,159,193 B2 | 4/2012 | Kato et al. |
| 8,358,202 B2 | 1/2013 | Takahashi |
| 8,429,634 B2 * | 4/2013 | Dembo .............. G06F 8/447 |
| | | 712/202 |
| 8,482,261 B2 | 7/2013 | Kato et al. |
| 8,698,219 B2 * | 4/2014 | Sekine .............. H01L 27/105 |
| | | 257/296 |
| 8,977,203 B2 | 3/2015 | Kato et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0212596 A1 * | 9/2007 | Nebrigic et al. .............. 429/61 |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0085516 A1 * | 4/2009 | Emori et al. .............. 320/118 |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0211765 A1 * | 8/2010 | Amidi et al. .............. 713/1 |
| 2010/0237829 A1 * | 9/2010 | Tatebayashi .............. H01M 4/661 |
| | | 320/118 |
| 2011/0176357 A1 | 7/2011 | Koyama et al. |
| 2011/0199825 A1 * | 8/2011 | Han .............. H01L 29/7926 |
| | | 365/185.11 |
| 2011/0205678 A1 | 8/2011 | Baba et al. |
| 2012/0170355 A1 | 7/2012 | Ohmaru et al. |
| 2013/0257354 A1 * | 10/2013 | Koyama .............. H02J 7/007 |
| | | 320/107 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-023639 A | 1/1996 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2011-176940 A | 9/2011 |
| WO | 2004/114391 A1 | 12/2004 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

(56) References Cited

OTHER PUBLICATIONS

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., "Optical Studies of the Amophous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZNO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In-Ga-Zn-O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In-Ga-Zn-Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In-Ga-Zn-Oxide TFT," AM-FPD '09 Digest of Technical Papers, Jul. 1, 2009, pp. 41-44.

Hayashi, R et al., "42.1: Invited Paper: Improved Amorphous In-Ga-Zn-O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZNO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3-A2O3-BO Systems [A; Fe, Ga, or Al; B: Mg, Mn, Fe, Ni, Cu,or Zn] at Temperatures Over 1000°C," Journal of Solid State Chemistry, 1985, vol. 60, pp. 382-384.

Kimizuka, N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 :SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "SUFTLA Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3-Ga2ZnO4-ZnO system at 1350°C," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

(56) References Cited

OTHER PUBLICATIONS

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters), Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZNO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In-Ga-Zn-Oxide TFTs With a Novel Passivation Layer," SID Digest '09 : SID International Symposium Digest of Technical Papers, May 31, 2009, pp. 284-287.

Ohara, H et al., "Amorphous In-Ga-Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B. (Physical Review. B), Jan. 15, 2000, vol. 61, No. 3, pp. 1811-1816.

Osada, T et al., "15.2: Development of Driver-Integrated Panel using Amorphous In-Ga-Zn-Oxide TFT," SID Digest '09 : SID International Symposium Digest of Technical Papers, May 31, 2009, pp. 184-187.

Osada, T et al., "Development of Driver-Integrated Panel Using Amorphous In-Ga-Zn-Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium-Gallium-Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In-Ga-Zn-Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

\* cited by examiner

PROTECTIVE CIRCUIT, BATTERY CHARGER, AND POWER STORAGE DEVICE

BACKGROUND OF THE INVENTION

1. Field of the Invention

The present invention relates to a protective circuit for controlling charging of a secondary battery and a battery charger including the protective circuit. The present invention also relates to a power storage device including a secondary battery in addition to the protective circuit or the battery charger.

2. Description of the Related Art

Overcharge and overdischarge of secondary batteries such as lithium ion batteries not only shorten their life but also cause ignition due to internal short-circuit. For this reason, a battery charger (also referred to as charger) for charging a secondary battery often includes a circuit for preventing overcharge and overdischarge, which is called a charging control circuit or a protective circuit, in addition to a power supply circuit.

The protective circuit recognizes the charging state of a secondary battery by monitoring a voltage across the secondary battery (a terminal voltage of the secondary battery). The protective circuit has a function of preventing the secondary battery from being overcharged in such a manner that, when the terminal voltage exceeds the upper limit, the protective circuit determines that the fully charged secondary battery is to be further charged, and interrupts the path of current supplied to the secondary battery. Alternatively, the protective circuit has a function of preventing the secondary battery from being over-discharged in such a manner that, when the terminal voltage falls below the lower limit, the protective circuit determines that the secondary battery is to be discharged beyond the capacity that should be left in the secondary battery, and interrupts the path of current discharged from the secondary battery.

Low power consumption is one of the important factors in evaluation of performance of electronic devices. In particular, low power consumption of a portable electronic device is strongly required because high power consumption leads to a disadvantage of short continuous use time. A secondary battery is often used in a portable electronic device such as a mobile phone; power necessary for the protective circuit to operate is supplied from the secondary battery when the secondary battery is not being charged. For this reason, lower power consumption of the protective circuit is also required.

Patent Document 1 discloses a protective circuit in which power consumption is reduced in such a manner that an overcharge detection circuit is turned on only for a short time at fixed intervals to perform overcharge detection operation. Patent Document 2 discloses a protective circuit in which power consumption is reduced by controlling the intervals between monitoring operations of an overcharge control circuit and an overdischarge detection circuit in accordance with a voltage across a secondary battery.

REFERENCE

Patent Document 1: Japanese Published Patent Application No. H8-023639
Patent Document 2: Japanese Published Patent Application No. 2011-176940

SUMMARY OF THE INVENTION

In Patent Documents 1 and 2, power supply voltage is continuously supplied to the protective circuit even though the number of measurements of the terminal voltage of a secondary battery is reduced. It is therefore considered that leakage power accounts for a large proportion of consumed power, and that a considerable amount of power consumed in the protective circuit will be still reduced.

The protective circuit includes a processor that determines whether the capacity of a secondary battery falls within an appropriate range or not by using data on a measured terminal voltage. When supply of the power supply voltage to the protective circuit is stopped, data in a buffer memory device such as a flip-flop or an SRAM used in the processor needs to be backed up because the buffer memory device is a volatile memory. The data can be backed up in an external nonvolatile memory device such as hard disk or a flash memory; however, this method is not suitable for a short-time power stop for the sake of reducing power consumption because it takes time to return the data from the external memory device to the buffer memory device in the protective circuit.

In view of the technical background mentioned above, an object of one embodiment of the present invention is to provide a low-power protective circuit, battery charger, or power storage device.

A protective circuit of one embodiment of the present invention includes a battery management unit (BMU), a power switch for controlling supply of power supply voltage to the battery management unit, and a power controller for controlling the operation of the power switch. The battery management unit has a function of determining whether a secondary battery needs to be charged or not from a detected value of the terminal voltage of the secondary battery. The terminal voltage of the secondary battery is intermittently detected in the protective circuit, and accordingly, whether charging is necessary or not is intermittently determined by the battery management unit accompanied by detection of the terminal voltage. The power controller has a function of stopping supply of the power supply voltage to the battery management unit by controlling the operation of the power switch so that the power switch is turned off (brought out of conduction) after the terminal voltage is detected before the voltage is detected next.

In one embodiment of the present invention, a buffer memory device in the battery management unit is a buffer memory device including a combination of a volatile memory element from/to which data can be read/written by supply of the power supply voltage and a memory element that can back up data stored in the nonvolatile memory element before supply of the power supply voltage is stopped. This structure prevents the data stored in the buffer memory device from being lost even if supply of the power supply voltage to the battery management unit is stopped, and allows the data to be read after supply of the power supply voltage to the battery management unit restarts. Consequently, it is not necessary to back up data in an external memory device before supply of the power supply voltage to the battery management unit is stopped; thus, supply of the power supply voltage to the battery management unit can be stopped in a period during which the terminal voltage is not detected in the protective circuit. As a result, leakage power generated in the battery management unit can be drastically reduced, so that the power consumption of the protective circuit can be reduced.

The volatile memory element included in the buffer memory device has a first logic element and a second logic element. Each of the logic elements has an input terminal to which the potential of an output terminal of the other logic element is input, and inverts the polarity of the potential of the input terminal and outputs the inverted potential from the output terminal. Specifically, a flip-flop or an SRAM can be used as the volatile memory element, for example. The memory element, which is included in the buffer memory device and used for data backup, can be a memory element in which supply, holding, and discharge of electric charge to, in, and from a capacitor or a floating node are controlled by a transistor with extremely low off-state current and thus data can retained even when supply of the power supply voltage is stopped, or a memory element such as MRAM, ReRAM, or FeRAM.

In particular, in the case of using the memory element in which supply, holding, and discharge of electric charge to, in, and from a capacitor or a floating node are controlled by a transistor with extremely low off-state current, data is written by supply of electric charge; therefore, a current necessary for writing data can be reduced to approximately 1/100 that of an MRAM or the like. As a result, the use of the buffer memory device including the memory element in the battery management unit can further reduce power consumption of the protective circuit.

Specifically, a protective circuit of one embodiment of the present invention includes a detection unit configured to detect a voltage across a secondary battery intermittently; a battery management unit that includes a buffer memory device and a processor and is configured to determine whether the secondary battery needs to be charged or not, based on a value of the voltage and arithmetic operation performed in the processor with use of the buffer memory device; a switch circuit configured to establish and break electrical continuity between the secondary battery and a host system configured to supply a current to the secondary battery and consume a current from the secondary battery; a switch control unit configured to select an on/off state of the switch circuit in accordance with the determination made by the battery management unit; a switch configured to control supply of a power supply voltage from the secondary battery to the battery management unit; and a power controller configured to stop supply of the power supply voltage to the battery management unit by turning off the switch after the voltage is detected in the detection unit before the voltage is detected next. The buffer memory device includes a volatile memory element from which data can be read and to which data can be written by supply of the power supply voltage; and a memory element capable of backing up the data stored in the volatile memory element, before supply of the power supply voltage is stopped.

A battery charger of one embodiment of the present invention includes a power supply circuit between the protective circuit and the host system.

A power storage device of one embodiment of the present invention includes a secondary battery in addition to the protective circuit.

With the above-described structure in one embodiment of the present invention, a low-power protective circuit, battery charger, or power storage device can be provided.

BRIEF DESCRIPTION OF THE DRAWINGS

In the accompanying drawings.

DETAILED DESCRIPTION OF THE INVENTION

Embodiments of the present invention will be hereinafter described in detail with reference to the accompanying drawings. Note that the present invention is not limited to the following description, and it is easily understood by those skilled in the art that the mode and details can be variously changed without departing from the scope and spirit of the present invention. Accordingly, the present invention should not be construed as being limited to the description of the embodiments below.

Embodiment 1

Figure 1:
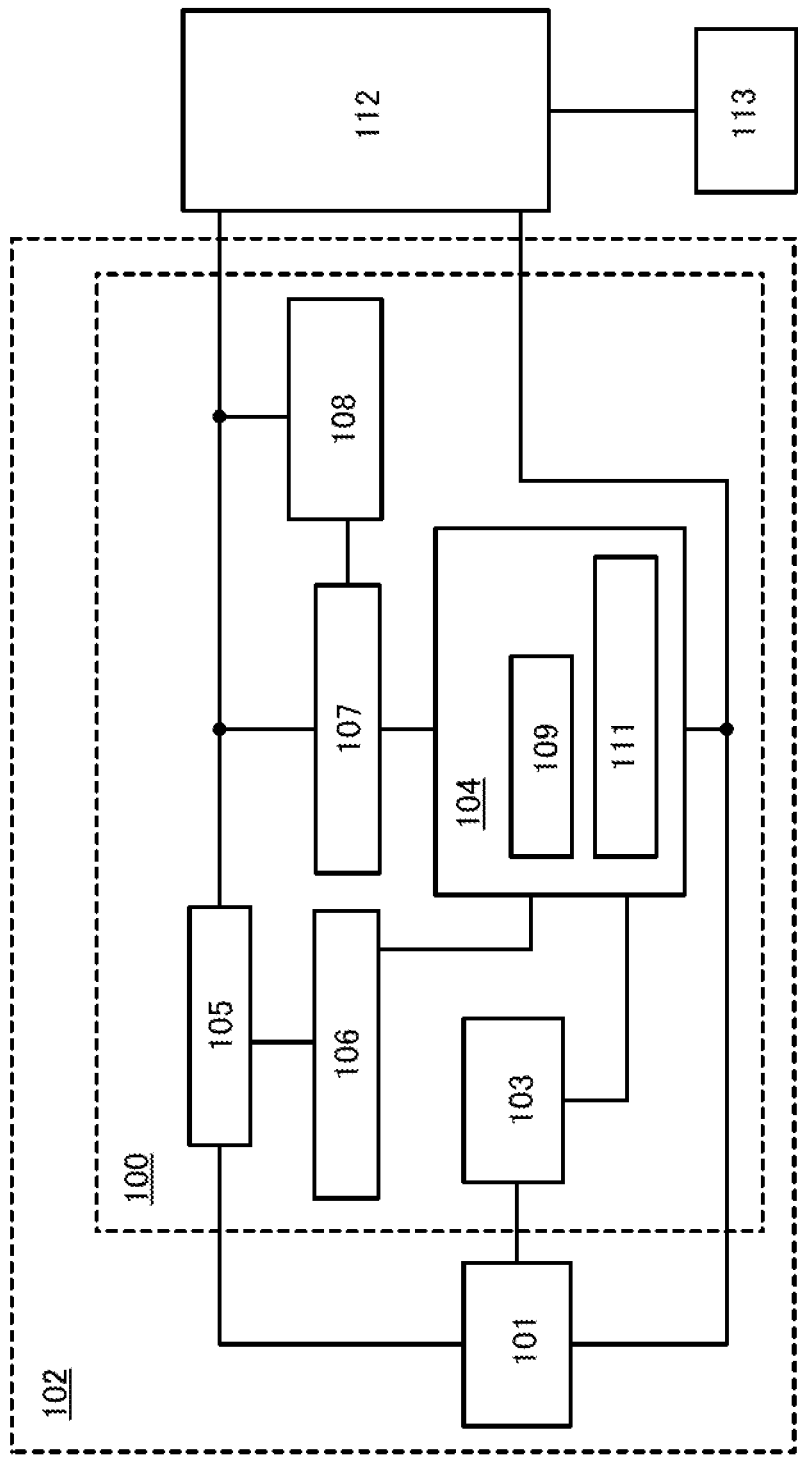
FIG. 1 illustrates the structure of a protective circuit and a power storage device.

FIG. 1 is a block diagram illustrating an example of the structure of a protective circuit 100 and a power storage device 102 in one embodiment of the present invention. In block diagrams shown in this specification, components are classified according to their functions and shown as independent blocks; however, it is practically difficult to completely separate the components according to their functions, and one component may be related to a plurality of functions.

The protective circuit 100 illustrated in FIG. 1 includes a detection unit 103, a battery management unit (BMU) 104, a switch circuit 105, a switch control unit 106, a power switch 107, and a power controller 108. The power storage device 102 includes a secondary battery 101 in addition to the protective circuit 100.

As the secondary battery 101, a lead-acid battery, a nickel-cadmium battery, a nickel-hydride battery, or a lithium-ion battery can be used, for example.

The detection unit 103 has a function of detecting a terminal voltage of the secondary battery 101. The detection unit 103 may also have a function of detecting a current supplied to the secondary battery 101 at the time of charging (i.e., charging current).

The BMU 104 has a function of determining whether the secondary battery 101 needs to be charged or not by using a detected value such as the level of the terminal voltage or the amount of the charging current detected by the detection unit 103.

Specifically, the BMU 104 includes a processor 109 and a buffer memory device 111 such as a register or a cache. The processor 109 has functions of a control device and an arithmetic device. Specifically, the processor 109 has a function of decoding and performing an inputted instruction and a function of performing a variety of arithmetic operations such as four arithmetic operations and logic operations.

The register, which is one kind of the buffer memory device 111, has a function of storing data obtained during the arithmetic operation of the processor 109, data obtained as a result of the arithmetic operation of the processor 109, data of an instruction that is to be executed next in the processor 109 and an address thereof, or the like. The cache, which is one kind of the buffer memory device 111, has a function of temporarily storing frequently used data.

Accordingly, the processor 109 performs a variety of arithmetic operations by using a detected value obtained in the detection unit 103, whereby the BMU 104 can determine whether the secondary battery 101 needs to be charged or not.

Note that a method of determining whether charging is necessary or not can vary depending on the kind of the secondary battery 101. For example, in the case where the secondary battery 101 is a nickel-cadmium battery or a nickel-hydride battery, the terminal voltage continues to rise after charging starts until the secondary battery 101 is fully charged, and the terminal voltage starts to decrease after the secondary battery 101 is fully charged. Consequently, in the case where the secondary battery 101 is a nickel-cadmium battery or a nickel-hydride battery, the BMU 104 can determine that the secondary battery 101 is fully charged and does not need to be charged anymore when the terminal voltage decreases from the highest voltage by a predetermined voltage.

Note that the terminal voltage of the secondary battery 101 in charging tends to be higher than that of the secondary battery 101 to which the protective circuit 100 is not connected, because of the internal impedance of the protective circuit 100. For this reason, particularly when the internal impedance is high, it is difficult for the BMU 104 to determine whether the secondary battery 101 is fully charged or not only by using the terminal voltage at the time of charging. In the case where the detection unit 103 has a function of detecting a charging current, since the charging current decreases as the state of the secondary battery 101 comes closer to a full charge state, the BMU 104 can correctly determine that the secondary battery 101 is fully charged when the charging current reaches a predetermined value, in spite of the fact that it is difficult for the BMU 104 to determine whether the secondary battery 101 is fully charged or not only by using the terminal voltage.

The switch circuit 105 has a function of establishing and breaking electrical continuity between the secondary battery 101 and a host system 112 that has a function of supplying current to the secondary battery 101 and a function of consuming current from the secondary battery 101. The switch control unit 106 has a function of selecting the on/off state of the switch circuit 105 in accordance with the determination made by the BMU 104 as to whether the secondary battery 101 needs to be charged or not.

The switch circuit 105 is controlled to be turned on (brought into conduction) by the switch control unit 106, whereby the host system 112 and the secondary battery 101 are connected to each other. With supply of current from an external power supply 113 to the secondary battery 101 through the host system 112, the secondary battery 101 is charged. With supply of current from the secondary battery 101 to the host system 112, the secondary battery 101 is discharged. When the switch circuit 105 is controlled to be turned off (brought out of conduction) by the switch control unit 106, the host system 112 and the secondary battery 101 are electrically separated from each other.

Note that in this specification, the term "connection" means electrical connection and corresponds to a state in which current, voltage, or a potential can be supplied or transmitted. Therefore, a state of being "connected" means not only a state of direct connection but also a state of indirect connection through an element such as a resistor, a diode, a transistor, or a capacitor, in which current, voltage, or a potential can be supplied or transmitted.

The power switch 107 has a function of controlling supply of power supply voltage from the secondary battery 101 to the BMU 104. The power switch 107 includes one or more switches. In the case where the power switch 107 includes a plurality of switches, the switches can individually control supply of the power supply voltage to the components included in the BMU 104, such as the processor 109 and the buffer memory device 111. Specifically, when one of the plurality of switches is on, the power supply voltage is supplied to the corresponding component through the switch. When one of the plurality of switches is off, supply of the power supply voltage to the corresponding component is stopped by the switch.

Note that the plurality of switches may individually control supply of the power supply voltage to components other than the processor 109 and the buffer memory device 111 included in the BMU 104. Alternatively, the plurality of switches may individually control supply of the power supply voltage to various components included in the processor 109 or various components included in the buffer memory device 111.

The power controller 108 has a function of managing supply of the power supply voltage to the components included in the BMU 104 by controlling the operation of the power switch 107. Specifically, the power controller 108 sends the power switch 107 an instruction to turn on a switch that is included in the power switch 107 and corresponds to a component to which the power supply voltage is to be supplied. Moreover, the power controller 108 sends the power switch 107 an instruction to turn off a switch that is included in the power switch 107 and corresponds to a component in which supply of the power supply voltage is to stop.

Note that the detection unit 103 intermittently obtains a detected value of the secondary battery 101, and accordingly, accompanied by obtainment of the detected value, the BMU 104 intermittently determines whether the secondary battery 101 needs to be charged or not. In other words, the BMU 104 is in a standby state in a period during which the BMU 104 does not make a determination. In view of this, in one embodiment of the present invention, supply of the power supply voltage to the BMU 104 is stopped in such a manner that the power controller 108 controls the power switch 107 to be turned off after the detection unit 103 obtains a detected value or after the BMU 104 finishes determining whether or not the charging is necessary, before the detected value is obtained next or before the BMU 104 determines whether or not the charging is necessary next.

In one embodiment of the present invention, the structure mentioned above can drastically reduce leakage power generated in the BMU 104 in the standby state, leading to a reduction in the power consumption of the protective circuit 100.

In the protective circuit 100 illustrated in FIG. 1, for example, when the BMU 104 operates for 0.01 seconds to determine whether the secondary battery 101 needs to be charged or not every second and the switching operation of the switch circuit 105 is completed in the aforementioned 0.01 seconds, the BMU 104 is in the standby state for the remaining 0.99 seconds. Thus, by stopping supply of the power supply voltage to the BMU 104 for the 0.99 seconds, the power consumption of the protective circuit 100 can be reduced.

The power controller 108 may have a function of controlling supply of the power supply voltage to a component other than the BMU 104 included in the protective circuit 100.

In the BMU 104, power is interrupted in a short period of time; therefore, the buffer memory device 111 used as the cache or the register needs high-speed operation as well as storing data even if power is interrupted. A flash memory, which is a nonvolatile memory device, does not meet the need of such high-speed performance and its data rewrite cycles are insufficient to be used as a cache or a register. In light of the above, the protective circuit 100 of one embodiment of the present invention uses the buffer memory device 111 including a combination of the following volatile memory element and memory element. The volatile memory element is an element from/to which data can be read/written by supply of the power supply voltage. The memory element can back up data stored in the volatile memory element before supply of the power supply voltage is stopped. The memory element achieves higher-speed operation and much data rewrite cycles than a flash memory, and can retain data even if power is interrupted.

The use of the buffer memory device 111 having the above structure prevents data stored in the buffer memory device 111 from being lost even if supply of the power supply voltage to the BMU 104 is stopped, and allows the data to be read after supply of the power supply voltage to the BMU 104 restarts. Consequently, it is not necessary to back up data in an external memory device before supply of the power supply voltage to the BMU 104 is stopped; thus, supply of the power supply voltage to the BMU 104 can be stopped when a period during which the terminal voltage is not detected in the protective circuit 100 is as long as 60 seconds or as short as several milliseconds. As a result, leakage power generated in the BMU 104 can be drastically reduced, so that the power consumption of the protective circuit 100 can be reduced.

Specifically, the volatile memory element included in the buffer memory device 111 has two logic elements. An input terminal of each of the logic elements is supplied with the potential of an output terminal of the other logic element. Each logic element inverts the polarity of the potential of the input terminal and outputs the inverted potential from the output terminal. For example, a flip-flop or an SRAM can be used as the volatile memory element. The memory element included in the buffer memory device 111 can be a memory element in which supply, holding, and discharge of electric charge to, in, and from a capacitor or a floating node are controlled by a transistor with extremely low off-state current and thus data can retained even when supply of the power supply voltage is stopped, or a memory element such as MRAM, ReRAM, or FeRAM.

Figure 2:
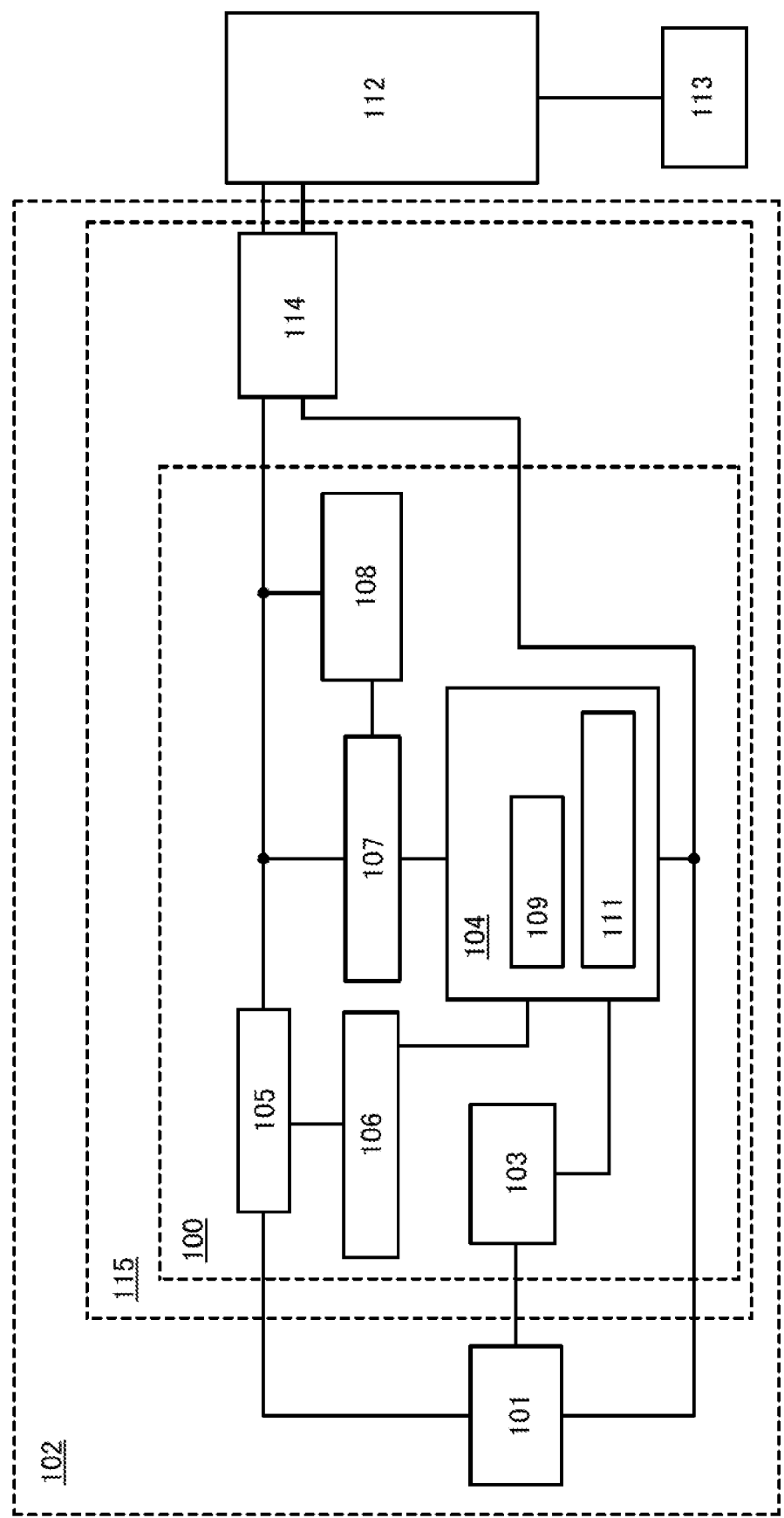
FIG. 2 illustrates the structure of a protective circuit, a power charger, and a power storage device.

FIG. 2 is a block diagram showing an example of the structure of a battery charger including the protective circuit 100 illustrated in FIG. 1. A battery charger 115 illustrated in FIG. 2 includes a power supply circuit 114 between the protective circuit 100 illustrated in FIG. 1 and the host system 112. The power storage device 102 illustrated in FIG. 2 includes the battery charger 115 and the secondary battery 101.

The power supply circuit 114 has a function of adjusting the level of the power supply voltage output from the secondary battery 101 and applying the adjusted voltage to the host system 112. Alternatively, the power supply circuit 114 has a function of adjusting the level of the power supply voltage supplied from the external power supply 113 to the battery charger 115 through the host system 112 and applying the adjusted voltage to the secondary battery 101 through the protective circuit 100.

An electronic device is configured using a combination of the host system 112 and the protective circuit 100 or the power storage device 102.

Next, the description is made on an example of a more specific structure of the protective circuit 100 and the power storage device 102 illustrated in FIG. 1.

Figure 3:
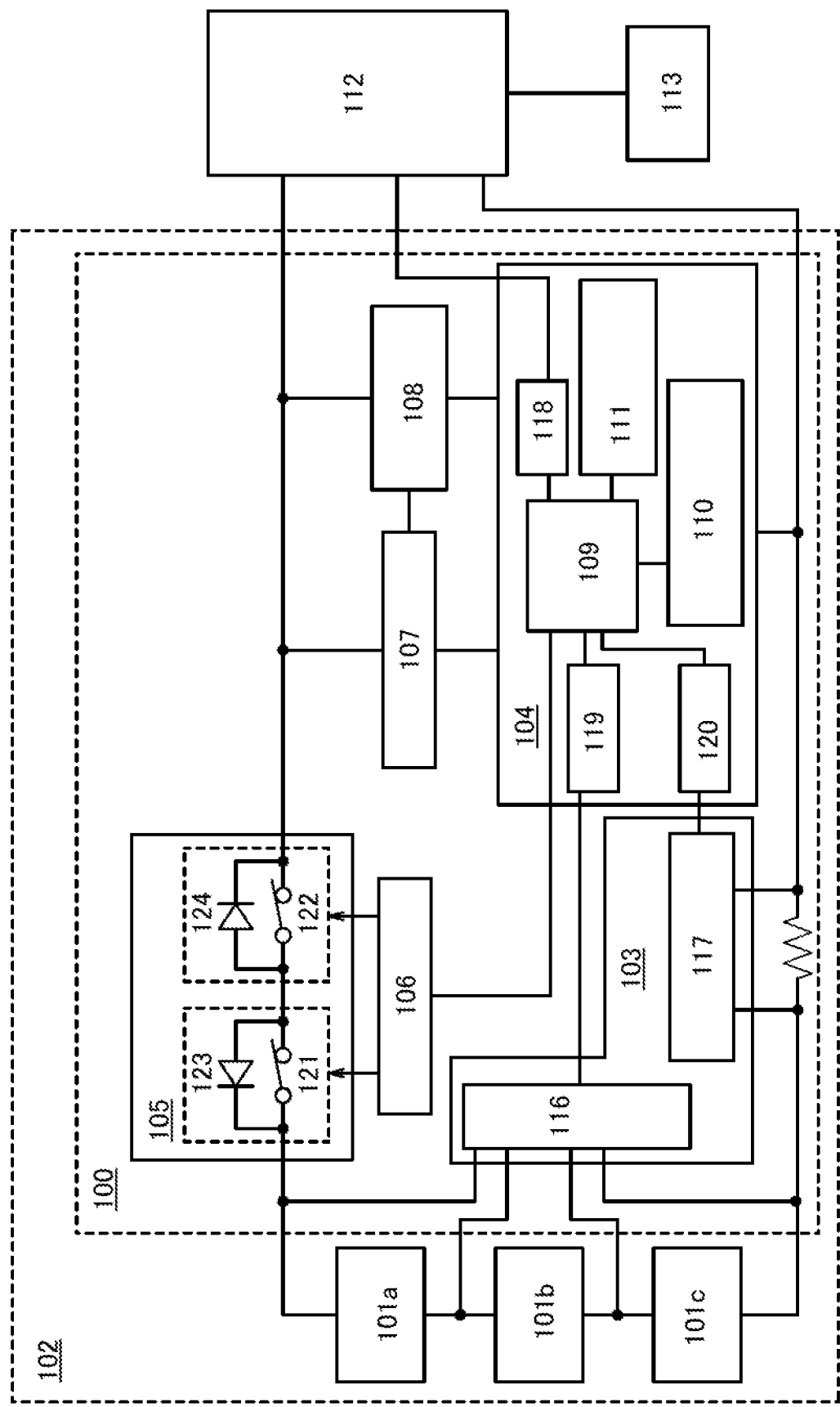
FIG. 3 illustrates the structure of a protective circuit and a power storage device.

FIG. 3 illustrates an example of the structure of the protective circuit 100 and the power storage device 102 in one embodiment of the present invention. Like the protective circuit 100 illustrated in FIG. 1, the protective circuit 100 illustrated in FIG. 3 includes the detection unit 103, the BMU 104, the switch circuit 105, the switch control unit 106, the power switch 107, and the power controller 108.

The power storage device 102 illustrated in FIG. 3 includes three secondary batteries 101a, 101b, and 101c that are connected in series, in addition to the protective circuit 100. Note that the number of secondary batteries included in the power storage device 102 may be one, two, or four or more.

In the protective circuit 100 illustrated in FIG. 3, the detection unit 103 includes a voltage detection unit 116 that has a function of detecting the terminal voltage of each of the secondary batteries 101a to 101c, and a current detection unit 117 that has a function of detecting a charging current flowing through the secondary batteries 101a to 101c.

In the protective circuit 100 illustrated in FIG. 3, the BMU 104 includes a memory device 110, an interface (IF) 118, an analog-to-digital converter circuit (ADC) 119, and an ADC 120 in addition to the processor 109 and the buffer memory device 111.

The memory device 110 stores a database, collections of data in which a detected value such as the level of the terminal voltage detected in the voltage detection unit 116 or the amount of charging current detected in the current detection unit 117 is related to necessity or unnecessity of charging of each of the secondary batteries 101a to 101c. The memory device 110 also stores a variety of data used for the arithmetic operation of the processor 109, an instruction executed in the processor 109, and the like.

Accordingly, the processor 109 performs a variety of arithmetic operations by using a detected value obtained in the detection unit 103 and data stored in the database, whereby the BMU 104 can determine whether the secondary battery 101 needs to be charged or not.

The IF 118 has a function of converting the format of a signal when the signal is transmitted and received between the host system 112 and the processor 109. The BMU 104 may determine whether charging is necessary or not by using a detected value obtained in the detection unit 103 in accordance with an instruction included in a signal from the host system 112. Alternatively, the BMU 104 may start or finish charging of the secondary batteries 101a to 101c in accordance with an instruction included in a signal from the host system 112 but against the determination as to whether charging is necessary or not as long as the secondary batteries are not overcharged or over-discharged. In addition, the end or start of charging of the secondary batteries 101a to 101c may be reported from the BMU 104 to the host system 112 by a signal.

In the protective circuit 100 illustrated in FIG. 3, the switch circuit 105 includes a switch 121, a switch 122, a diode 123, and a diode 124. The switch 121 and the switch 122 are connected in series in the current path between the secondary batteries 101a to 101c and the host system 112. The diode 123 is connected in parallel with the switch 121, and the diode 124 is connected in parallel with the switch 122. Thus, the diode 123 and the diode 124 are connected in series in the current path between the secondary batteries 101a to 101c and the host system 112. Note that the diode 123 and the diode 124 are connected in series so that the directions of current flowing in the forward direction are opposite to each other.

When the switches 121 and 122 in the switch circuit 105 having the above structure are controlled to be turned on and off, respectively, by the switch control unit 106, current flows from the secondary batteries 101a to 101c to the host system 112 through the switch 121 and the diode 124. Thus, the secondary batteries 101a to 101c are discharged. On the other hand, when the switches 121 and 122 in the switch circuit 105 are controlled to be turned off and on, respectively, by the switch control unit 106, current flows from the host system 112 to the secondary batteries 101a to 101c through the switch 122 and the diode 123. Thus, the secondary batteries 101a to 101c are charged.

Figure 4:
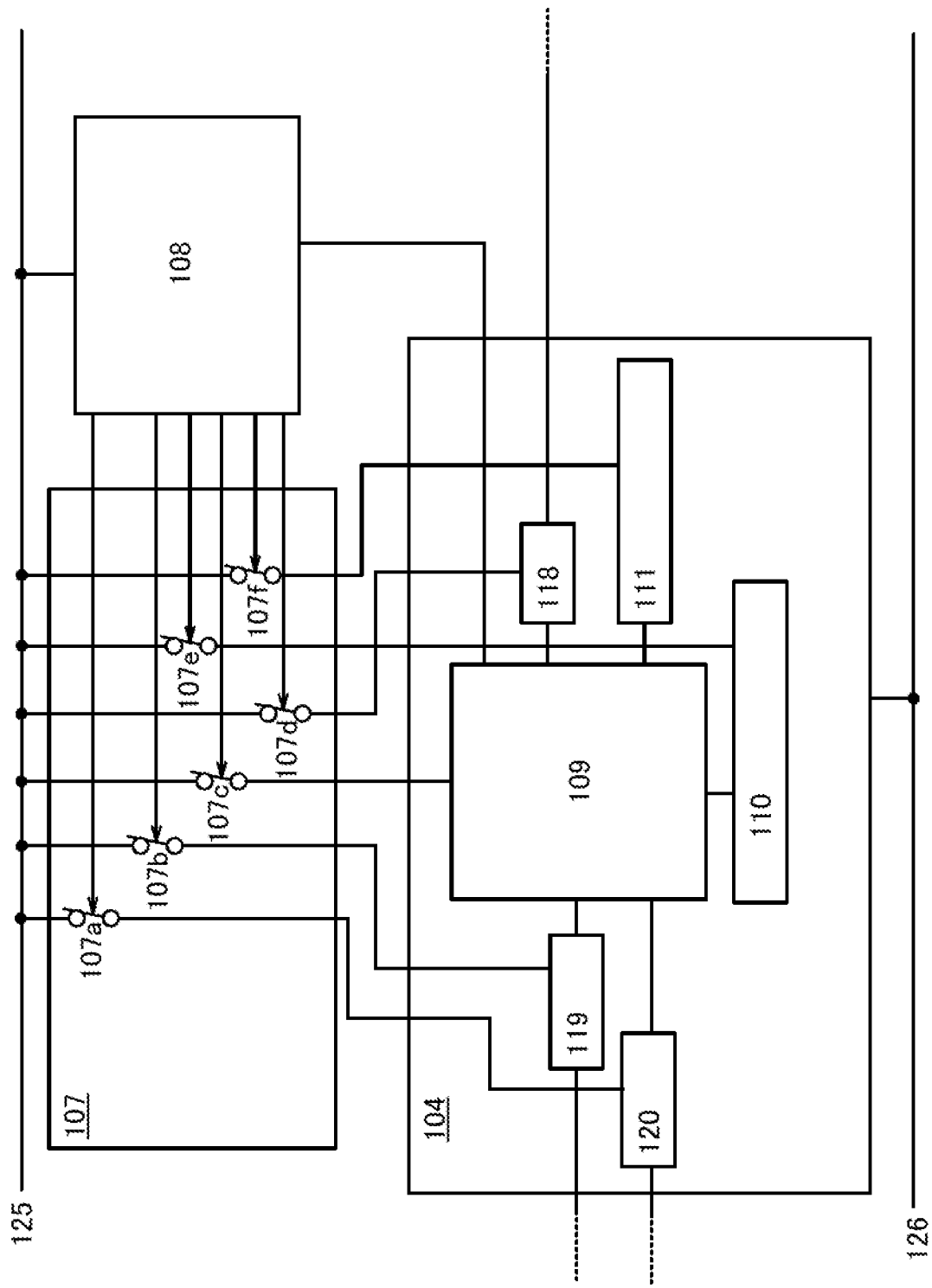
FIG. 4 illustrates the structure of a BMU, a power switch, and a power controller.

FIG. 4 illustrates an example of a more specific structure of the power switch 107 illustrated in FIG. 3. FIG. 4 only shows the BMU 104, the power switch 107, and the power controller 108 among the components in the protective circuit 100 in FIG. 3.

The power switch 107 illustrated in FIG. 4 includes switches 107a to 107f. As has been described, the number of switches included in the power switch 107 may be one, or may be two or more except six.

A wiring 125 and a wiring 126 have a function of the path of current flowing between the secondary batteries 101a to 101c and the host system 112 illustrated in FIG. 3. One of the wirings 125 and 126 is supplied with a high potential and the other is supplied with a low potential.

In FIG. 4, the switches 107a to 107f have a function of controlling supply of the potential of the wiring 125 to the BMU 104. The potential of the wiring 126 is supplied to the BMU 104 regardless of the on/off state of the switches 107a to 107f.

Note that the protective circuit 100 of one embodiment of the present invention may have a structure in which the switches 107a to 107f have a function of controlling supply of the potential of the wiring 126 to the BMU 104 and the potential of the wiring 125 is supplied to the BMU 104 regardless of the on/off state of the switches 107a to 107f. Alternatively, the protective circuit 100 of one embodiment of the present invention may include a combination of a power switch that controls supply of the potential of the wiring 125 to the BMU 104 and a power switch that controls supply of the potential of the wiring 126 to the BMU 104.

In FIG. 4, when the switch 107a is turned on, the potential difference between the wirings 125 and 126 is supplied to the ADC 120 as the power supply voltage. When the switch 107b is turned on, the potential difference between the wirings 125 and 126 is supplied to the ADC 119 as the power supply voltage. When the switch 107c is turned on, the potential difference between the wirings 125 and 126 is supplied to the processor 109 as the power supply voltage. When the switch 107d is turned on, the potential difference between the wirings 125 and 126 is supplied to the IF 118 as the power supply voltage. When the switch 107e is turned on, the potential difference between the wirings 125 and 126 is supplied to the memory device 110 as the power supply voltage. When the switch 107f is turned on, the potential difference between the wirings 125 and 126 is supplied to the buffer memory device 111 as the power supply voltage.

Then, as has been described, the power controller 108 in one embodiment of the present invention controls the power switch 107 to be turned off so that supply of the power supply voltage to the BMU 104 is stopped after the detection unit 103 obtains a detected value or after the BMU 104 finishes determining whether or not the charging is necessary, before the detected value is obtained next or before the BMU 104 determines whether or not the charging is necessary next. Note that all of the switches 107a to 107f are not necessarily turned off when the power switch 107 is turned off; turning off at least one of the switches 107a to 107f brings about an effect of reducing power consumption in one embodiment of the present invention. Moreover, the timings at which at least one of the switches 107a to 107f is turned on and off may be different from those of the other switches.

As illustrated in FIG. 4, a plurality of switches are provided in the power switch to individually stop supply of the power supply voltage to each component in the BMU 104 in a period during which the BMU 104 is in the standby state, whereby leakage power generated in the BMU 104 can be further reduced compared to the case where supply of the power supply voltage to the whole BMU 104 is controlled by one switch. Consequently, the power consumption of the protective circuit 100 can be reduced.

Embodiment 2

Figure 6:
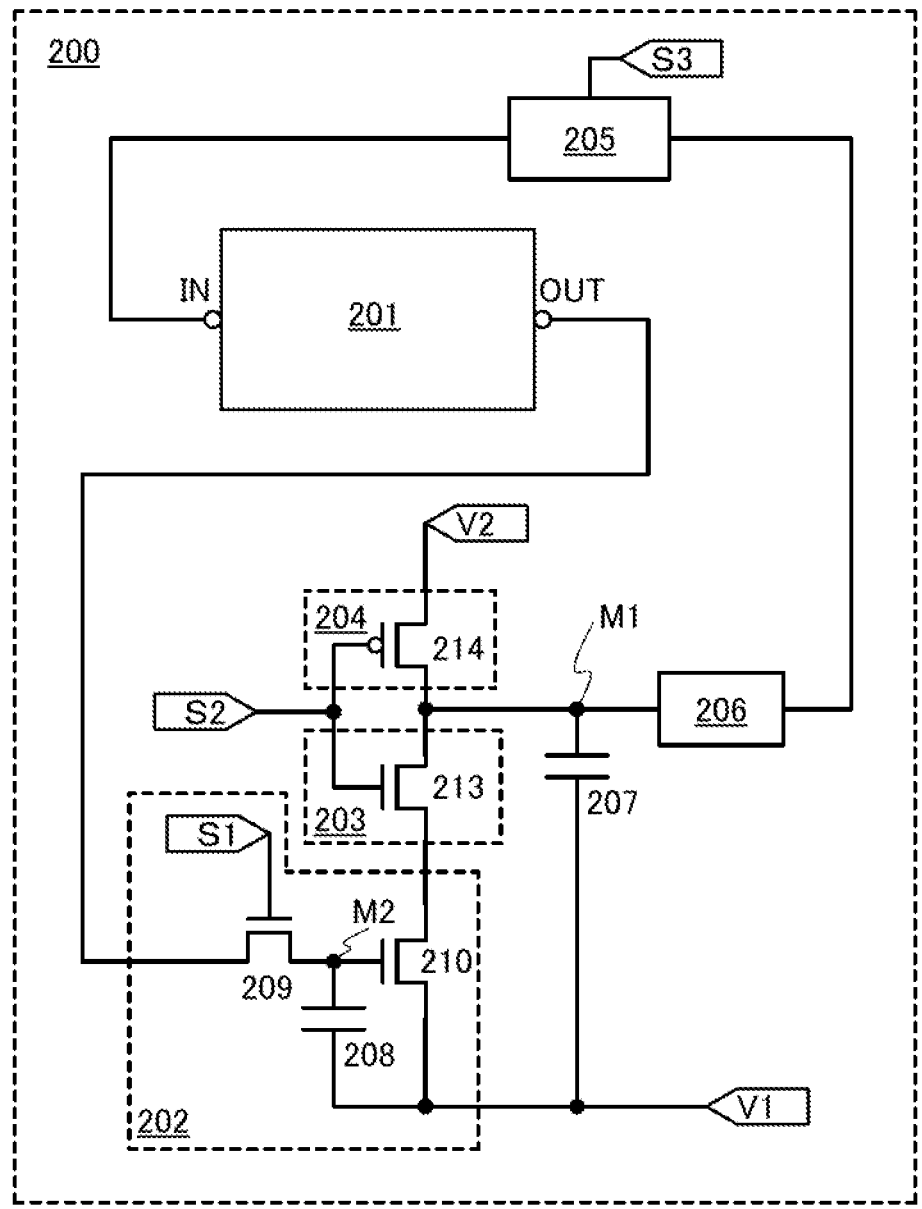
FIG. 6 is a circuit diagram of a unit memory circuit.

Next, as one embodiment of the present invention, an example of the structure of the buffer memory device 111 illustrated in FIG. 1 will be described. In one embodiment of the present invention, the buffer memory device 111 includes a plurality of unit memory circuits each having a combination of a volatile memory element and a memory element that can retain data for a period as long as 60 seconds or as short as several milliseconds after supply of the power supply voltage is stopped. FIG. 6 illustrates an example of a circuit diagram of a unit memory circuit 200.

The unit memory circuit 200 includes a first memory element 201, a second memory element 202, a switch 203, a switch 204, a switch 205, a logic element 206 that inverts the polarity of an inputted signal and outputs the inversion signal, and a capacitor 207. The first memory element 201 corresponds to the volatile memory element, which retains data only in a period during which the power supply voltage is supplied. The second memory element 202 corresponds to the memory element, which can retain data even after supply of the power supply voltage is stopped. The second memory element 202 includes a capacitor 208 and a transistor 210 that correspond to a memory, and a transistor 209 for controlling supply, holding, and discharge of electric charge in the memory.

Note that the unit memory circuit 200 may also include another circuit element such as a diode, a resistor, or an inductor as needed.

It is preferable that the off-state current of the transistor 209 be extremely low. The low off-state current of the transistor 209 leads to a reduction in the amount of electric charge leaked from the memory, thereby ensuring a long period during which data is retained in the second memory element 202. A transistor having a channel formation region containing a semiconductor that has a wide bandgap and is highly purified by reduction in impurities such as moisture and hydrogen serving as electron donors (donors) and reduction in oxygen defects has extremely low off-state current, and thus is preferably used as the transistor 209.

FIG. 6 illustrates an example in which the switch 203 is a transistor 213 having one conductivity type (e.g., an n-channel transistor) and the switch 204 is a transistor 214 having another conductivity type (e.g., a p-channel transistor).

A first terminal of the switch 203 corresponds to one of a source terminal and a drain terminal of the transistor 213. A second terminal of the switch 203 corresponds to the other of the source terminal and the drain terminal of the transistor 213. Conduction or non-conduction between the first terminal and the second terminal of the switch 203 (i.e., the on/off state of the transistor 213) is selected with a control signal S2 input to a gate electrode of the transistor 213.

Note that a source terminal of a transistor means a source region that is part of an active layer or a source electrode connected to an active layer. Similarly, a drain terminal of a transistor means a drain region that is a part of an active layer or a drain electrode connected to an active layer.

The terms "source terminal" and "drain terminal" of a transistor interchange with each other depending on the type of the channel of the transistor or levels of potentials applied to the source terminal and the drain terminal. In general, in an n-channel transistor, one to which a lower potential is applied is called a source terminal, and one to which a higher potential is applied is called a drain terminal. In a p-channel transistor, one to which a lower potential is applied is called a drain terminal, and one to which a higher potential is applied is called a source terminal. In this specification, although the connection relation of the transistor is sometimes described assuming that the source terminal and the drain terminal are fixed for convenience, actually, the names of the source terminal and the drain terminal may interchange with each other depending on the relation of the potentials.

A first terminal of the switch 204 corresponds to one of a source terminal and a drain terminal of the transistor 214. A second terminal of the switch 204 corresponds to the other of the source terminal and the drain terminal of the transistor 214. Conduction or non-conduction between the first terminal and the second terminal of the switch 204 (i.e., the on/off state of the transistor 214) is selected with the control signal S2 input to a gate electrode of the transistor 214.

One of a source terminal and a drain terminal of the transistor 209 is electrically connected to one of a pair of electrodes of the capacitor 208 and a gate electrode of the transistor 210. The gate electrode of the transistor 210 is referred to as a node M2.

One of a source terminal and a drain terminal of the transistor 210 is connected to a wiring to which a potential V1 is applied. The other of the source terminal and the drain terminal of the transistor 210 is connected to the first terminal of the switch 203. The second terminal of the switch 203 is connected to the first terminal of the switch 204. The second terminal of the switch 204 is connected to a wiring to which a potential V2 is applied. The second terminal of the switch 203, the first terminal of the switch 204, an input terminal of the logic element 206, and one of a pair of electrodes of the capacitor 207 are connected to each other. The second terminal of the switch 203 and the first terminal of the switch 204 are referred to as a node M1.

Note that a constant potential can be applied to the other of the pair of electrodes of the capacitor 207. For example, a low potential (e.g., a ground potential) or a high potential can be applied to the other of the pair of electrodes of the capacitor 207. The other of the pair of electrodes of the capacitor 207 may be connected to the wiring to which the potential V1 is applied. A constant potential can be applied to the other of the pair of electrodes of the capacitor 208. For example, a low potential (e.g., a ground potential) or a high potential can be applied to the other of the pair of electrodes of the capacitor 208. The other of the pair of electrodes of the capacitor 208 may be connected to the wiring to which the potential V1 is applied. FIG. 6 illustrates an example in which the other of the pair of electrodes of the capacitor 207 and the other of the pair of electrodes of the capacitor 208 are connected to the wiring to which the potential V1 is applied.

It is possible not to provide the capacitor 207 by positively utilizing parasitic capacitance or the like. It is possible not to provide the capacitor 208 by positively utilizing gate capacitance of the transistor 210 or the like. Note that gate capacitance corresponds to capacitance formed between a gate electrode and an active layer.

A control signal S1 is input to a gate electrode of the transistor 209. In each of the switches 203 and 204, conduction or non-conduction between the first terminal and the second terminal is selected with the control signal S2, which is different from the control signal S1. When the first terminal and the second terminal of one of the switches 203 and 204 are in a conduction state, the first terminal and the second terminal of the other switch are in a non-conduction state. In the switch 205, conduction or non-conduction between a first terminal and a second terminal is selected with a control signal S3 that is different from the control signal S1 and the control signal S2.

A signal corresponding to data retained in the first memory element 201 is input to the other of the source terminal and the drain terminal of the transistor 209. FIG. 6 illustrates an example in which a signal output from an output terminal OUT of the first memory element 201 is input to the other of the source terminal and the drain terminal of the transistor 209. The polarity of a signal output from the second terminal of the switch 203 is inverted by the logic element 206, and the inversion signal is input to the first memory element 201 through the switch 205 in which the first terminal and the second terminal are brought into conduction by the control signal S3.

Note that FIG. 6 illustrates an example in which a signal output from the second terminal of the switch 203 is input to an input terminal (denoted by IN in FIG. 6) of the first memory element 201 through the logic element 206 and the switch 205; however, one embodiment of the present invention is not limited to this structure. A signal output from the second terminal of the switch 203 may be input to the first memory element 201 without its polarity being inverted. For example, in the case where the first memory element 201 has a node that holds a signal obtained by inversion of the polarity of a signal input from the input terminal, a signal output from the second terminal of the switch 203 can be input to the node.

In FIG. 6, a voltage corresponding to a difference between the potential V1 and the potential V2 is supplied to the unit memory circuit 200 as the power supply voltage. The voltage corresponding to the difference between the potential V1 and the potential V2 is supplied to the first memory element 201 as the power supply voltage. In a period during which the power supply voltage is not supplied to the first memory element 201, the potential V1 and the potential V2 are substantially equal to each other.

Note that the switch 205 can be a transistor; the transistor may be either an n-channel transistor or a p-channel transistor. Alternatively, an n-channel transistor and a p-channel transistor may be used in combination. For example, an analog switch can be used as the switch 205.

In FIG. 6, the transistor 209 can have two gate electrodes above and below a semiconductor film including an oxide semiconductor. In this case, the control signal S1 can be input to one of the gate electrodes, and a control signal S4 can be input to the other of the gate electrodes. The control signal S4 may be a signal having a constant potential. The constant potential may be the potential V1 or the potential V2. Alternatively, the two gate electrodes provided above and below the semiconductor film may be connected to each other and supplied with the control signal S1. The threshold voltage of the transistor 209 can be controlled by a signal input to the other of the gate electrodes of the transistor 209. Control of the threshold voltage can further reduce the off-state current of the transistor 209.

In FIG. 6, among the transistors used in the unit memory circuit 200, transistors except the transistor 209 may have a channel formation region including a semiconductor other than a wide bandgap semiconductor such as an oxide semiconductor. For example, transistors except the transistor 209 may be a transistor in which a channel formation region is formed in a semiconductor film including silicon or a silicon substrate.

Although FIG. 6 illustrates an example where the transistor 209 has a single-gate structure, the transistor 209 may have a multi-gate structure in which a plurality of electrically connected gate electrodes are provided so that a plurality of channel formation regions are included.

The first memory element 201 in FIG. 6 includes a first logic element and a second logic element. An input terminal of the first logic element is connected to an output terminal of the second logic element. An input terminal of the second logic element is connected to an output terminal of the first logic element. The first logic element and the second logic element each output a signal corresponding to an inputted signal only in a period during which the power supply voltage is supplied.

For example, an inverter or a clocked inverter can be used as the first logic element and/or the second logic element.

Next, a method for driving the unit memory circuit 200 in FIG. 6 will be described with reference to a timing chart in FIG. 7.

Figure 7:
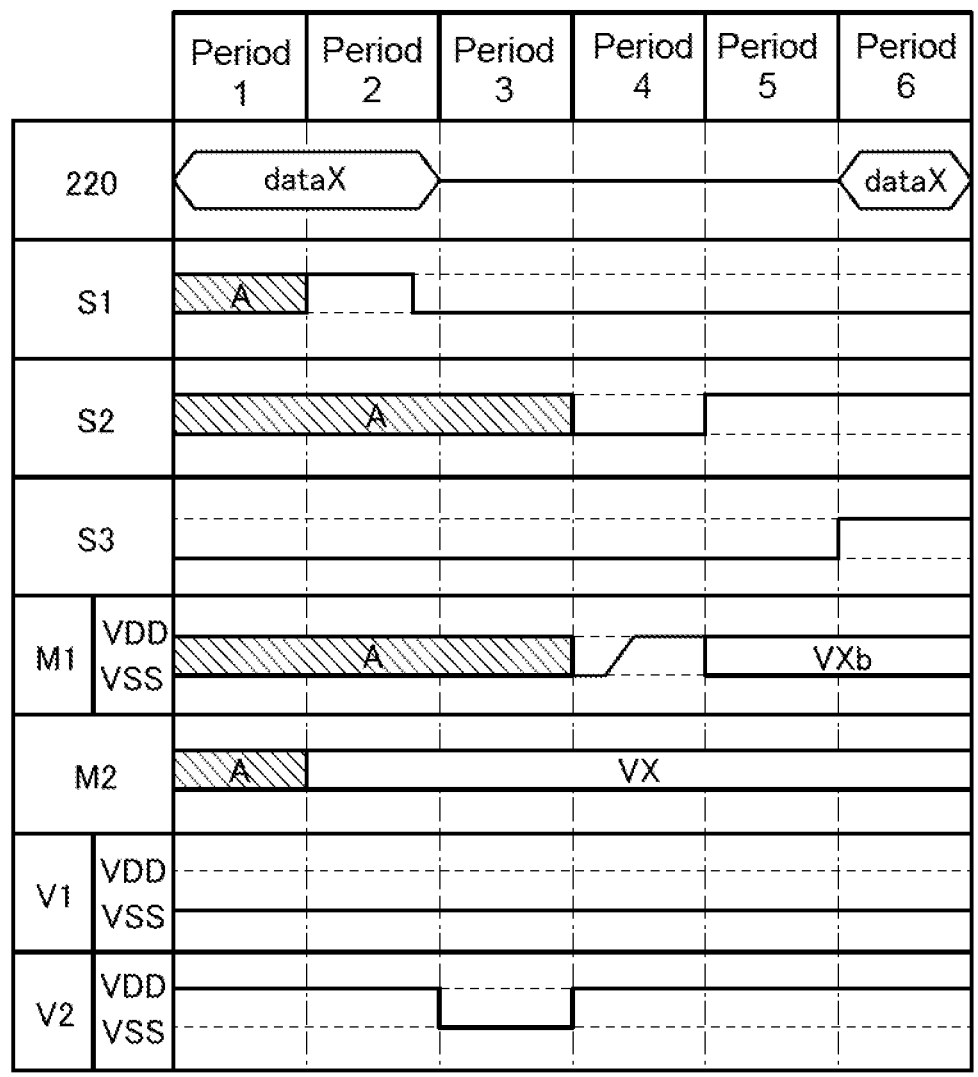
FIG. 7 is a timing chart showing the operation of a unit memory circuit.

In the timing chart in FIG. 7, reference numeral 220 denotes data retained in the first memory element 201; S1 denotes the potential of the control signal S1; S2 denotes the potential of the control signal S2; S3 denotes the potential of the control signal S3; V1 denotes the potential V1; and V2 denotes the potential V2. When the power supply voltage is not supplied to the unit memory circuit 200, a difference V between the potential V1 and the potential V2 is approximately 0. Reference symbol M1 denotes the potential of the node M1, and M2 denotes the potential of the node M2.

Note that the driving method described below is an example for the structure illustrated in FIG. 6 in which the switch 203 is an n-channel transistor and the switch 204 is a p-channel transistor. In this example, when the potential of the control signal S2 is high, the first terminal and the second terminal of the switch 203 are in a conduction state, and the first terminal and the second terminal of the switch 204 are in a non-conduction state. When the potential of the control signal S2 is low, the first terminal and the second terminal of the switch 203 are in a non-conduction state, and the first terminal and the second terminal of the switch 204 are in a conduction state. Further, the first terminal and the second terminal of the switch 205 are in a conduction state when the potential of the control signal S3 is high, and the first terminal and the second terminal of the switch 205 are in a non-conduction state when the potential of the control signal S3 is low. Moreover, an n-channel transistor is used as the transistor 209. The transistor 209 is turned on when the potential of the control signal S1 is high, and is turned off when the potential of the control signal S1 is low.

Alternatively, it is possible to set the potential of each control signal so that the on/off states of the switch 203, the switch 204, the switch 205, and the transistor 209 are the same as in the following description.

In the following example, the potential V1 is a low potential VSS, and the potential V2 switches between a high potential VDD and the potential VSS. The potential VSS may be a ground potential, for example. Note that one embodiment of the present invention is not limited to this, and the potential V2 may be the potential VSS and the potential V1 may switch between the potential VDD and the potential VSS.

(Normal Operation)

The operation in a period 1 in FIG. 7 is described. In the period 1, the power supply voltage is supplied to the unit memory circuit 200. In the period 1, the potential V2 is the potential VDD. In a period during which the power supply voltage is supplied to the unit memory circuit 200, data (indicated by dataX in FIG. 7) is retained in the first memory element 201. At this time, the potential of the control signal S3 is set low so that the first terminal and the second terminal of the switch 205 are in a non-conduction state. Note that the first terminal and the second terminal of each of the switches 203 and 204 may be in a conduction state or a non-conduction state. In other words, the potential of the control signal S2 may be high or low (the potential is indicated by A in FIG. 7). The transistor 209 may be on or off. In other words, the potential of the control signal S1 may be high or low (the potential is indicated by A in FIG. 7). In the period 1, the potential of the node M1 may be high or low (the potential is indicated by A in FIG. 7). In the period 1, the potential of the node M2 may be high or low (the potential is indicated by A in FIG. 7). The operation in the period 1 is referred to as normal operation.

(Operation before Stop of Supply of Power Supply Voltage)

The operation in a period 2 in FIG. 7 is described. Before supply of the power supply voltage to the unit memory circuit 200 is stopped, the potential of the control signal S1 is set high so that the transistor 209 is turned on. Thus, a signal corresponding to the data (dataX) retained in the first memory element 201 is input to the gate electrode of the transistor 210 through the transistor 209. The signal input to the gate electrode of the transistor 210 is held by the capacitor 208 or the gate capacitance of the transistor 210. Accordingly, the potential of the node M2 becomes a signal potential corresponding to the data retained in the first memory element 201 (the potential is indicated by VX in FIG. 7). After that, the potential of the control signal S1 is set low so that the transistor 209 is turned off. Thus, the signal corresponding to the data retained in the first memory element 201 is held in the second memory element 202. Also in the period 2, the first terminal and the second terminal of the switch 205 remain in a non-conduction state by the control signal S3. The first terminal and the second terminal of each of the switches 203 and 204 may be in either a conduction state or a non-conduction state. In other words, the potential of the control signal S2 may be high or low (the potential is indicated by A in FIG. 7). In the period 2, the potential of the node M1 may be high or low (the potential is indicated by A in FIG. 7). The operation in the period 2 is referred to as operation before stop of supply of the power supply voltage.

The operation in a period 3 in FIG. 7 is described. After the operation before the stop of supply of the power supply voltage is performed, the potential V2 is set to the potential VSS at the beginning of the period 3, and supply of the power supply voltage to the unit memory circuit 200 is stopped. When supply of the power supply voltage is stopped, the data (dataX) retained in the first memory element 201 is lost. However, even after supply of the power supply voltage to the unit memory circuit 200 is stopped, the signal potential (VX) corresponding to the data (dataX) retained in the first memory element 201 is held in the node M2 by the capacitor 208 or the gate capacitance of the transistor 210. Since the transistor 209 has extremely low off-state current, the potential held by the capacitor 208 or the gate capacitance of the transistor 210 (the potential VX of the node M2) can be held for a long time. Thus, the data (dataX) is retained even after supply of the power supply voltage to the unit memory circuit 200 is stopped. The period 3 corresponds to a period during which supply of the power supply voltage to the unit memory circuit 200 is stopped.

(Operation of Restarting Supply of Power Supply Voltage)

The operation in a period 4 in FIG. 7 is described. After supply of the power supply voltage to the unit memory circuit 200 is restarted by setting the potential V2 to the potential VDD, the potential of the control signal S2 is set low so that the first terminal and the second terminal of the switch 204 are in a conduction state and the first terminal and the second terminal of the switch 203 are in a non-conduction state. At this time, the potential of the control signal S1 is low, and the transistor 209 is kept off. The potential of the control signal S3 is low, and the first terminal and the second terminal of the switch 205 are in a non-conduction state. Thus, the potential VDD, which is a constant potential, can be applied to the second terminal of the switch 203 and the first terminal of the switch 204 (the node M1) (hereinafter, this operation is referred to as precharge operation). The potential of the node M1 is held by the capacitor 207.

After the precharge operation, in a period 5, the potential of the control signal S2 is set high so that the first terminal and the second terminal of the switch 203 are in a conduction state and the first terminal and the second terminal of the switch 204 are in a non-conduction state. At this time, the potential of the control signal S1 remains low, and the transistor 209 is kept off. The potential of the control signal S3 is low, and the first terminal and the second terminal of the switch 205 are in a non-conduction state. Depending on a signal held by the capacitor 208 or the gate capacitance of the transistor 210 (the potential VX of the node M2), the on/off state of the transistor 210 is selected, so that the potential of the second terminal of the switch 203 and the first terminal of the switch 204 (i.e., the potential of the node M1) is decided. Specifically, when the transistor 210 is on, the potential V1 (e.g., the potential VSS) is applied to the node M1. On the other hand, when the transistor 210 is off, the potential of the node M1 remains at the constant potential (e.g., the potential VDD) that is decided by the precharge operation. In this manner, depending on the on state or the off state of the transistor 210, the potential of the node M1 becomes the potential VDD or the potential VSS.

For example, when the signal held in the first memory element 201 corresponds to a digital value "1", the potential of a signal output from the output terminal OUT of the first memory element 201 is high. In this case, the potential of the node M1 becomes the low potential VSS corresponding to a signal with a digital value "0". On the other hand, when the signal held in the first memory element 201 corresponds to a digital value "0", the potential of a signal output from the output terminal OUT of the first memory element 201 is low. In this case, the potential of the node M1 becomes the high potential VDD corresponding to a signal with a digital value "1". That is, a potential corresponding to a digital value that is different from the digital value of the signal stored in the first memory element 201 is held in the node M1. This potential is denoted as VXb in FIG. 7. In other words, the potential of a signal corresponding to the data (dataX) input from the first memory element 201 in the period 2 is converted into the potential VXb of the node M1.

After that, in a period 6, the potential of the control signal S3 is set high so that the first terminal and the second terminal of the switch 205 are in a conduction state. At this time, the potential of the control signal S2 remains high. The potential of the control signal S1 remains low, and the transistor 209 is kept off. Thus, a signal corresponding to the potential of the second terminal of the switch 203 and the first terminal of the switch 204 (the potential VXb of the node M1) is inverted by the logic element 206 to be an inversion signal corresponding to the data (dataX). The inversion signal is input to the first memory element 201. As a result, the first memory element 201 can retain again the data (dataX) that has been retained before stop of supply of the power supply voltage to the unit memory circuit 200.

In the unit memory circuit 200 illustrated in FIG. 6, after the potential of the node M1 is set to the constant potential (the potential VDD in FIG. 7) by the precharge operation in the period 4, the potential of the node M1 is set to the potential VXb corresponding to the data (dataX) in the period 5; thus, it takes a shorter time to set the potential of the node M1 to the predetermined potential VXb. In other words, in the unit memory circuit 200 in FIG. 6, the switches 203 and 204 enable precharge operation, so that it takes a shorter time to retain the original data in the first memory element 201 after supply of the power supply voltage restarts.

In one embodiment of the present invention, in a period during which the power supply voltage is not supplied to each unit memory circuit 200 included in the buffer memory device, data stored in the first memory element 201, which corresponds to a volatile memory element, can be retained by the capacitor 208 or the gate capacitance of the transistor 210 in the second memory element 202.

The transistor 209 has extremely low off-state current because an oxide semiconductor is included in a channel formation region. Thus, by using the transistor 209, even when the power supply voltage is not supplied to the unit memory circuit 200, electric charge held by the capacitor 208 or the gate capacitance of the transistor 210 is held for a long time. Consequently, the unit memory circuit 200 can retain data even in a period during which supply of the power supply voltage is stopped.

In the second memory element 202, the signal held by the capacitor 208 or the gate capacitance of the transistor 210 reflects the state (the on state or the off state) of the transistor 210 after supply of the power supply voltage to the unit memory circuit 200 restarts; thus, the signal can be read from the second memory element 202 by the drain current of the transistor 210. Consequently, the original signal can be accurately read even when a potential corresponding to the signal held by the capacitor 208 or the gate capacitance of the transistor 210 fluctuates to some degree.

When the unit memory circuit 200 is used in a buffer memory device such as a register or a cache memory included in the BMU 104, data in the buffer memory device can be prevented from being lost by stop of supply of the power supply voltage. Further, the state before the stop of supply of the power supply voltage can be backed up in a short time, and the buffer memory device can return to the state before the stop of supply of the power supply voltage in a short time after supply of the power supply voltage restarts. Thus, in the BMU 104, supply of the power supply voltage can be stopped even for a time as long as 60 seconds or as short as several milliseconds. As a result, the protective circuit 100 that consumes less power can be provided.

Note that the unit memory circuit 200 with the structure in FIG. 6 corresponds to one embodiment of the present invention; each unit memory circuit in the buffer memory device included in the BMU 104 may have a structure different from the structure in FIG. 6.

Next, another example of the structure of the unit memory circuit 200 that is different from the structure in FIG. 6 will be described with reference to FIG. 8.

Figure 8:
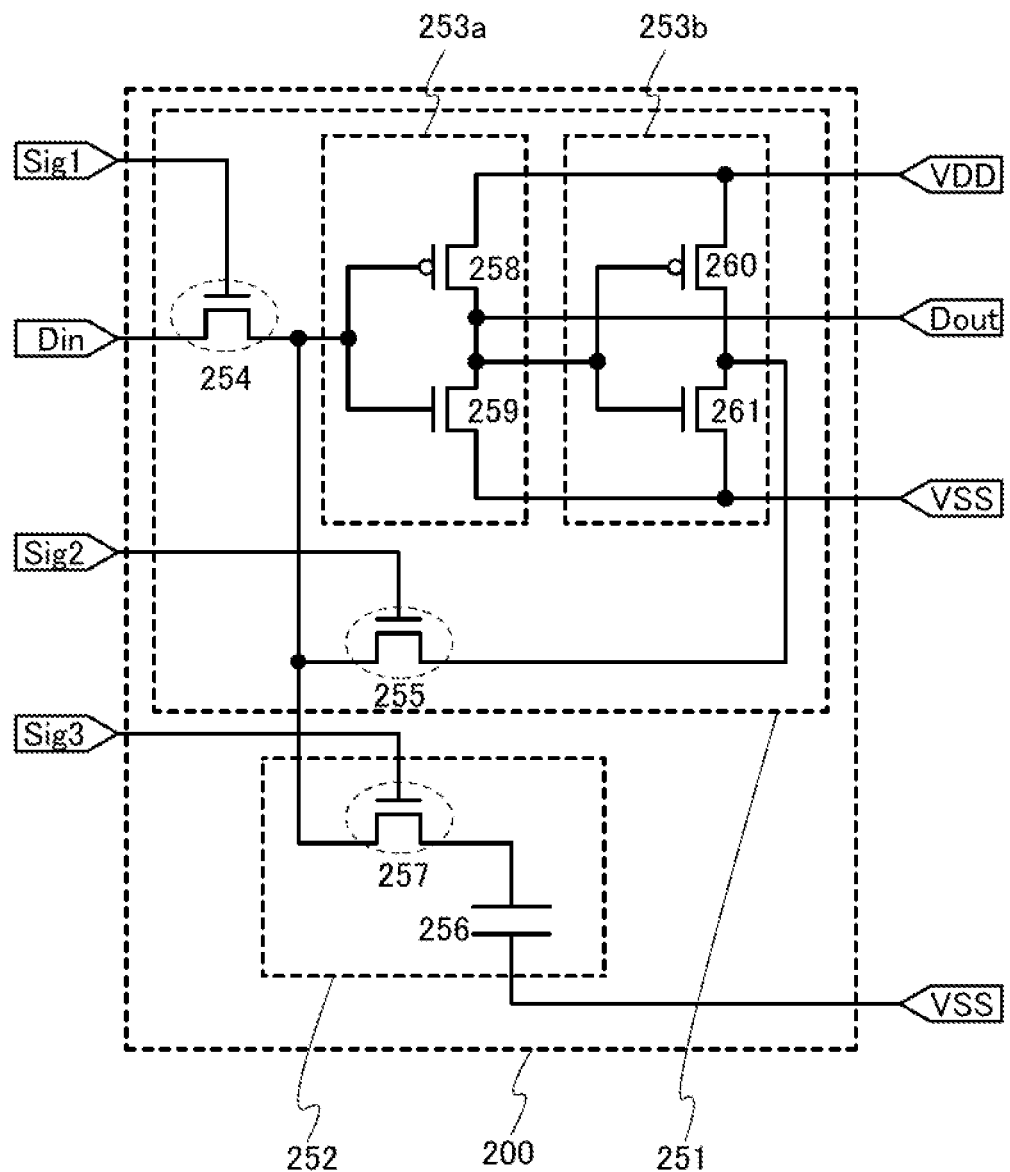
FIG. 8 is a circuit diagram of a unit memory circuit.

The unit memory circuit 200 illustrated in FIG. 8 includes a volatile first memory element 251 and a second memory element 252 that can retain data even after supply of the power supply voltage is stopped. The first memory element 251 includes a first logic element 253a and a second logic element 253b that invert the polarity of an inputted signal and output an inversion signal, a transistor 254, and a transistor 255. The second memory element 252 includes a transistor 257 and a capacitor 256 corresponding to a memory.

A signal Din including data input to the unit memory circuit 200 is supplied to an input terminal of the first logic element 253a through the transistor 254. An output terminal of the first logic element 253a is connected to an input terminal of the second logic element 253b. An output terminal of the second logic element 253b is connected to the input terminal of the first logic element 253a through the transistor 255. The potential of the output terminal of the first logic element 253a or the input terminal of the second logic element 253b is output to the subsequent unit memory circuit 200 or another circuit as a signal Dout.

Note that in FIG. 8, inverters are used as the first logic element 253a and the second logic element 253b; alternatively, instead of the inverter, a clocked inverter can be used as the first logic element 253a and/or the second logic element 253b.

The capacitor 256 is connected to an input terminal of the unit memory circuit 200, that is, a node to which the potential of the signal Din is applied, through the transistor 254 and the transistor 257 so that the data of the signal Din input to the unit memory circuit 200 can be stored as needed. Specifically, one of a pair of electrodes of the capacitor 256 is connected to the input terminal of the first logic element 253a through the transistor 257. The other of the pair of electrodes of the capacitor 256 is connected to a node to which the low potential VSS (e.g., a ground potential) is applied.

It is preferable that the off-state current of the transistor 257 be extremely low. The low off-state current of the transistor 257 leads to a reduction in the amount of electric charge leaked from the memory, thereby ensuring a long period during which data is retained in the second memory element 252. A transistor having a channel formation region containing a semiconductor that has a wide bandgap and is highly purified by reduction in impurities such as moisture and hydrogen serving as electron donors (donors) and reduction in oxygen defects has extremely low off-state current, and thus is preferably used as the transistor 257.

Note that FIG. 8 illustrates an example where the transistor 257 has a single-gate structure; alternatively, the transistor 257 may have a multi-gate structure in which a plurality of electrically connected gate electrodes are provided so that a plurality of channel formation regions are included.

Note that the unit memory circuit 200 may also include another circuit element such as a diode, a resistor, or an inductor as needed.

In the first logic element 253a, a p-channel transistor 258 and an n-channel transistor 259, the gate electrodes of which are connected to each other, are connected in series between a first node to which the high potential VDD is applied and a second node to which the low potential VSS is applied. Specifically, a source terminal of the p-channel transistor 258 is connected to the first node to which the potential VDD is applied, and a source terminal of the n-channel transistor 259 is connected to the second node to which the potential VSS is applied. A drain terminal of the p-channel transistor 258 is connected to a drain terminal of the n-channel transistor 259, and the potential of the two drain terminals can be regarded as the potential of the output terminal of the first logic element 253a. The potential of the gate electrodes of the p-channel transistor 258 and the n-channel transistor 259 can be regarded as the potential of the input terminal of the first logic element 253a.

In the second logic element 253b, a p-channel transistor 260 and an n-channel transistor 261, the gate electrodes of which are connected to each other, are connected in series between the first node to which the high potential VDD is applied and the second node to which the low potential VSS is applied. Specifically, a source terminal of the p-channel transistor 260 is connected to the first node to which the potential VDD is applied, and a source terminal of the n-channel transistor 261 is connected to the second node to which the potential VSS is applied. A drain terminal of the p-channel transistor 260 is connected to a drain terminal of the n-channel transistor 261, and the potential of the two drain terminals can be regarded as the potential of the output terminal of the second logic element 253b. The potential of the gate electrodes of the p-channel transistor 260 and the n-channel transistor 261 can be regarded as the potential of the input terminal of the second logic element 253b.

The on/off state of the transistor 254 is selected with a signal Sig1 supplied to a gate electrode of the transistor 254. The on/off state of the transistor 255 is selected with a signal Sig2 supplied to a gate electrode of the transistor 255. The on/off state of the transistor 257 is selected with a control signal Sig3 supplied to a gate electrode of the transistor 257.

Note that the first logic element 253a and the second logic element 253b need to operate at high speed. Thus, a transistor including crystalline silicon or crystalline germanium in a channel formation region is preferably used as the n-channel transistor 259 or the p-channel transistor 258 included in the first logic element 253a or the n-channel transistor 261 or the p-channel transistor 260 included in the second logic element 253b.

Note that the transistor 254 or the transistor 255 may include crystalline silicon or crystalline germanium in a channel formation region.

Next, an example of the operation of the unit memory circuit 200 illustrated in FIG. 8 will be described.

First, at the time of data writing, the transistor 254 is turned on and the transistors 255 and 257 are turned off. Then, the potential VDD is applied to the first node and the potential VSS is applied to the second node, so that the power supply voltage is applied to the first memory element 251. The potential of the signal Din supplied to the unit memory circuit 200 is applied to the input terminal of the first logic element 253a through the transistor 254, so that the potential of the output terminal of the first logic element 253a has a polarity opposite to that of the signal Din. Then, the transistor 255 is turned on to connect the input terminal of the first logic element 253a and the output terminal of the second logic element 253b, so that data is written into the first logic element 253a and the second logic element 253b.

Next, in the case where the inputted data is retained in the first logic element 253a and the second logic element 253b, the transistor 255 is kept on, the transistor 257 is kept off, and the transistor 254 is turned off. By turning off the transistor 254, the inputted data is retained in the first logic element 253a and the second logic element 253b. At this time, the potential VDD is supplied to the first node and the potential VSS is supplied to the second node, whereby the state in which the power supply voltage is applied between the first node and the second node is maintained.

The potential of the output terminal of the first logic element 253a reflects the data retained in the first logic element 253a and the second logic element 253b. Thus, by reading the potential, the data can be read from the unit memory circuit 200.

Note that in the case where supply of the power supply voltage is stopped at the time of data retention, the data is retained in the capacitor 256 before supply of the power supply voltage is stopped. When the data is retained in the capacitor 256, first, the transistor 254 is turned off and the transistors 255 and 257 are turned on. Then, electric charge with an amount corresponding to the value of the data retained in the first logic element 253a and the second logic element 253b is accumulated in the capacitor 256 through the transistor 257, so that the data is written into the capacitor 256. After the data is stored in the capacitor 256, the transistor 257 is turned off, whereby the data stored in the capacitor 256 is retained. After the transistor 257 is turned off, the potential VSS, for example, is applied to the first node and the second node so that the nodes have equal potentials, and application of the power supply voltage between the first node and the second node is stopped. Note that the transistor 255 may be turned off after the data is stored in the capacitor 256.

In this manner, in the case where the inputted data is retained in the capacitor 256, it is not necessary to apply the power supply voltage between the first node and the second node; thus, off-state current flowing between the first node and the second node through the p-channel transistor 258 and the n-channel transistor 259 included in the first logic element 253a or between the p-channel transistor 260 and the n-channel transistor 261 included in the second logic element 253b can be as close to zero as possible. As a result, power consumption due to the off-state current of the first memory element 251 in holding the data can be significantly reduced, and the power consumption of a protective circuit including the buffer memory device as well as that of the buffer memory device can be reduced.

As described above, the transistor 257 has extremely low off-state current. Thus, when the transistor 257 is off, the electric charge accumulated in the capacitor 256 does not easily leak, so that the data is retained.

When the data stored in the capacitor 256 is read, the transistor 254 is turned off. Then, the potential VDD is supplied again to the first node and the potential VSS is supplied again to the second node, whereby the power supply voltage is applied between the first node and the second node. Then, by turning on the transistor 257, the signal Dout having a potential that reflects the data can be read from the unit memory circuit 200.

Figure 9A:
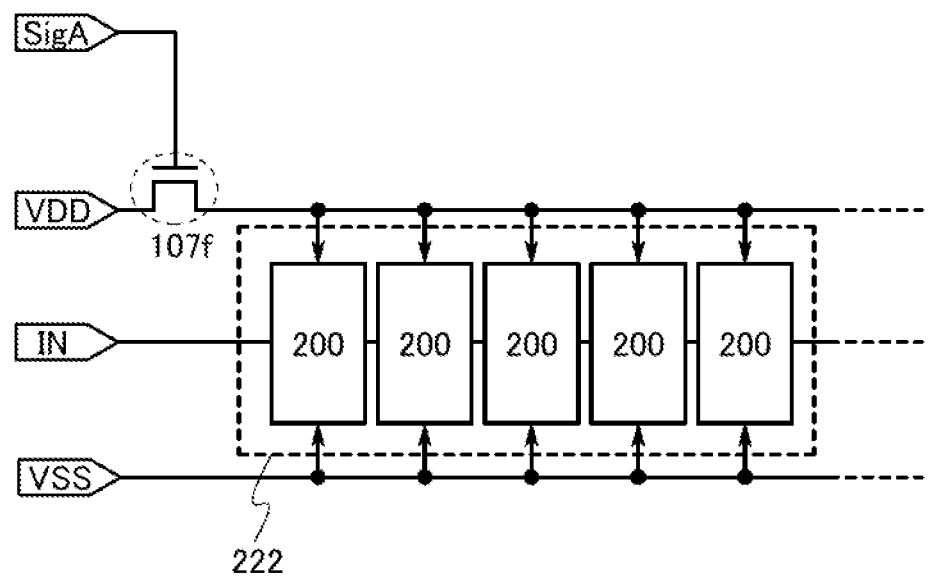
FIGS. 9A and 9B each illustrate the structure of a buffer memory device.

Next, FIG. 9A illustrates an example of a connection structure of the unit memory circuit 200 in which the buffer memory device 111 is a register. A buffer memory device illustrated in FIG. 9A includes a memory circuit group 222 including a plurality of unit memory circuits 200. Each of the unit memory circuits 200 included in the memory circuit group 222 is supplied with the high potential VDD through the switch 107f illustrated in FIG. 4. In addition, each unit memory circuit 200 in the memory circuit group 222 is supplied with the potential of the signal IN and the low potential VSS.

In FIG. 9A, the on/off state of the switch 107f is selected with a control signal SigA that is applied to a gate electrode of the switch 107f from the power controller 108.

Figure 9B:
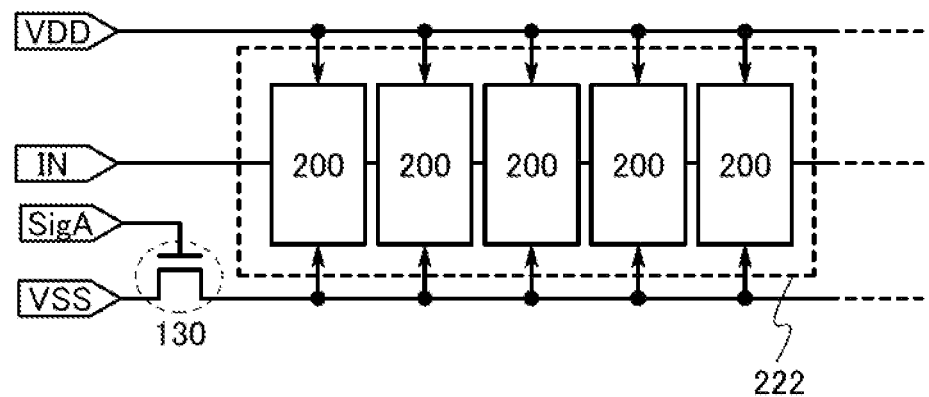

The switch 107f controls supply of the high potential VDD to each of the unit memory circuits 200 included in the memory circuit group 222 in FIG. 9A; alternatively, a switch included in the power switch may control supply of the low potential VSS. FIG. 9B illustrates an example of a buffer memory device in which each of the unit memory circuits 200 included in the memory circuit group 222 is supplied with the low potential VSS through a switch 130. Supply of the low potential VSS to each unit memory circuit 200 in the memory circuit group 222 can be controlled by the switch 130.

Note that in the unit memory circuit 200 including the second memory element in which supply, holding, and discharge of electric charge to, in, and from the capacitor or the floating node is controlled using a transistor with extremely low off-state current as illustrated in FIG. 6 and FIG. 8, the amount of power consumed by data backup and recovery (overhead power consumption) is smaller than that in a unit memory circuit including an MRAM or the like as the second memory element. Specifically, a current necessary for data writing in an MRAM is said to be 50 µA to 500 µA. On the other hand, in the unit memory circuit 200 having the structure illustrated in FIG. 6 or FIG. 8, a current needed for data writing can be approximately 1/100 that of an MRAM because data is backed up by supply of electric charge to the capacitor. As a result, a power shut-off time during which the overhead power consumption and power cut by power shut-off become equal in amount, that is, a break even time (BET) can be shorter in the unit memory circuit 200 having the structure illustrated in FIG. 6 or FIG. 8 than in a unit memory circuit including an MRAM. Consequently, the power consumption of the protective circuit can be reduced.

This embodiment can be implemented in combination with any of the other embodiments as appropriate.

Embodiment 3

Figure 5:
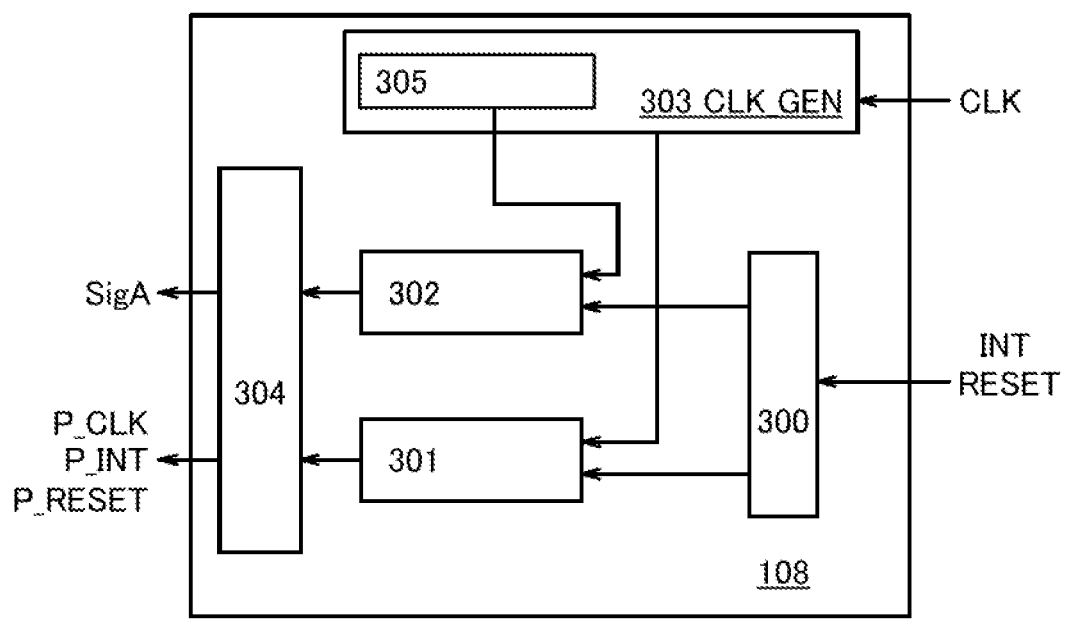
FIG. 5 illustrates the structure of a power controller.

FIG. 5 is a block diagram illustrating an example of the structure of the power controller 108. The power controller 108 includes an interface (IF) 300, a controller 301, a controller 302, a clock generator (CLK_GEN) 303, and a buffer 304.

The IF 300 has a function of converting the format of signals from the host system 112 and the processor 109 illustrated in FIG. 1 and a function of removing noise, for example.

The clock generator (CLK_GEN) 303 includes a frequency divider circuit 305 and has a function of generating a clock signal used in various circuits in the power controller 108, such as the IF 300, the controller 301, the controller 302, and the buffer 304, from a clock signal CLK input from the host system 112.

The controller 301 has a function of generating a reset signal (P_RESET), an interrupt signal (P_INT), and the like for the processor 109 from various signals such as a reset signal (RESET) and an interrupt signal (INT) input from the host system 112 through the IF 300. The controller 301 also has a function of generating a clock signal (P_CLK) for the processor 109 from the clock signal input from the clock generator (CLK_GEN) 303.

The controller 302 has a function of generating the signal SigA for controlling the operation of a switch included in the power switch, in accordance with a signal input from the processor 109 through the IF 300. Alternatively, the controller 302 may have a function of generating the signal SigA by using a lower frequency clock signal obtained by dividing the clock signal by the frequency divider circuit 305.

This embodiment can be implemented in combination with any of the other embodiments as appropriate.

Embodiment 4

Figure 10:
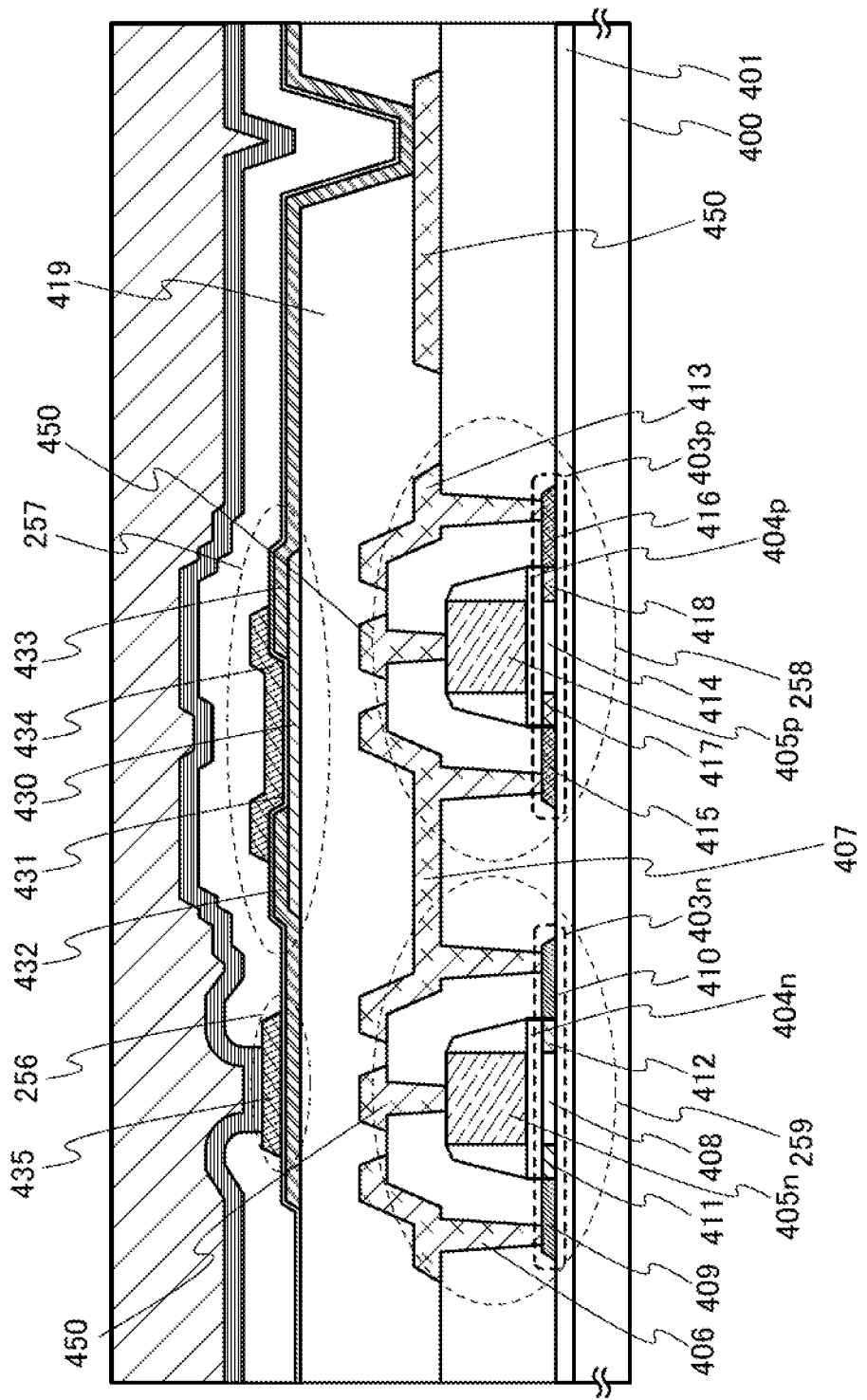
FIG. 10 is a cross-sectional view of a unit memory circuit.

In this embodiment, an example of a cross-sectional structure of the unit memory circuit 200 illustrated in FIG. 8 will be described. FIG. 10 is a cross-sectional view illustrating an example of structures of the p-channel transistor 258, the n-channel transistor 259, the capacitor 256, and the transistor 257. In this embodiment, a cross-sectional structure of the unit memory circuit 200 will be described using, as an example, the case where the transistors 258 and 259 each include an active layer containing an amorphous, microcrystalline, polycrystalline, or single crystal semiconductor (e.g., silicon or germanium) and the transistor 257 includes an active layer containing an oxide semiconductor.

As silicon, any of the following can be used, for example: amorphous silicon manufactured by sputtering or vapor phase growth such as plasma CVD, polycrystalline silicon obtained by crystallization of amorphous silicon by treatment such as laser annealing, and single crystal silicon obtained in such a manner that a surface portion of a single crystal silicon wafer is separated after implantation of hydrogen ions or the like into the silicon wafer.

In FIG. 10, the transistors 258 and 259 are provided over a substrate 400 having a surface on which an insulating film 401 is formed.

The transistor 259 includes a semiconductor film 403n including crystalline silicon, a gate insulating film 404n over the semiconductor film 403n, a gate electrode 405n provided to overlap the semiconductor film 403n with the gate insulating film 404n placed therebetween, and a conductive film 406 and a conductive film 407 connected to the semiconductor film 403n. The semiconductor film 403n includes a first region 408 serving as a channel formation region and second regions 409 and 410 serving as a source region and a drain region. The first region 408 is sandwiched between the second regions 409 and 410. Note that FIG. 10 illustrates an example where the semiconductor film 403n includes third regions 411 and 412 serving as lightly doped drain (LDD) regions between the first region 408 and the second region 409 and between the first region 408 and the second region 410.

The transistor 258 includes a semiconductor film 403p including crystalline silicon, a gate insulating film 404p over the semiconductor film 403p, a gate electrode 405p provided to overlap the semiconductor film 403p with the gate insulating film 404p placed therebetween, and the conductive film 407 and a conductive film 413 connected to the semiconductor film 403p. The semiconductor film 403p includes a first region 414 serving as a channel formation region and second regions 415 and 416 serving as a source region and a drain region. The first region 414 is sandwiched between the second regions 415 and 416. FIG. 10 illustrates an example where the semiconductor film 403p includes third regions 417 and 418 serving as LDD regions between the first region 414 and the second region 415 and between the first region 414 and the second region 416.

In FIG. 10, the transistors 258 and 259 share the conductive film 407.

The gate electrode 405n of the transistor 259 and the gate insulating film 404p of the transistor 258 are connected to a conductive film 450.

FIG. 10 illustrates the case where each of the transistors 258 and 259 includes a thin semiconductor film; alternatively, each of the transistors 258 and 259 may have a channel formation region in a bulk semiconductor substrate. For the thin semiconductor film, polycrystalline silicon obtained by crystallization of amorphous silicon with the use of a laser or single crystal silicon obtained in such a manner that a surface portion of a single crystal silicon wafer is separated after implantation of hydrogen ions or the like into the silicon wafer can be used, for example.

In FIG. 10, an insulating film 419 is provided over the conductive films 406, 407, and 413. The transistor 257 is provided over the insulating film 419.

The transistor 257 includes, over the insulating film 419, a semiconductor film 430 including an oxide semiconductor; conductive films 432 and 433 that are provided over the semiconductor film 430 and function as source and drain electrodes; a gate insulating film 431 over the semiconductor film 430 and the conductive films 432 and 433; and a gate electrode 434 that overlaps the semiconductor film 430 in the region between the conductive films 432 and 433, with the gate insulating film 431 placed between the gate electrode 434 and the semiconductor film 430.

The conductive film 433 is connected to the conductive film 450 through an opening provided in the insulating film 419.

A conductive film 435 is provided over the gate insulating film 431 to overlap the conductive film 432. A portion where the conductive film 435 overlaps the conductive film 432 with the gate insulating film 431 placed therebetween functions as the capacitor 256.

Note that FIG. 10 illustrates the case where the capacitor 256, together with the transistor 257, is provided over the insulating film 419; alternatively, the capacitor 256, together with the transistors 258 and 259, may be provided below the insulating film 419.

In FIG. 10, the transistor 257 includes the gate electrode 434 on at least one side of the oxide semiconductor film 430. Alternatively, the transistor 257 may include a pair of gate electrodes provided with the oxide semiconductor film 430 placed therebetween.

When the transistor 257 has a pair of gate electrodes between which the semiconductor film 430 is provided, one of the gate electrodes is supplied with a signal for turning on or off the transistor 257, and the other of the gate electrodes may be in a floating state (i.e., electrically insulated) or supplied with a potential. In the latter case, potentials with the same level may be supplied to the pair of electrodes, or a fixed potential such as a ground potential may be supplied only to the other of the gate electrodes. By controlling the level of a potential supplied to the other of the gate electrodes, the threshold voltage of the transistor can be controlled.

Examples of a semiconductor material that has a wider bandgap than a silicon semiconductor and has a lower intrinsic carrier density than silicon include a compound semiconductor such as gallium nitride (GaN), in addition to an oxide semiconductor. The use of the oxide semiconductor has the following advantages. Unlike the case of using gallium nitride, transistors having excellent electrical characteristics can be formed by sputtering or a wet process and thus can be mass-produced easily. Further, unlike gallium nitride, the oxide semiconductor can be deposited at room temperature, whereby transistors having excellent electrical characteristics can be formed over a glass substrate or an integrated circuit using silicon. Moreover, the oxide semiconductor can respond to an increase in substrate size. Accordingly, among the wide bandgap semiconductors, the oxide semiconductor particularly has an advantage of high mass productivity. When a crystalline oxide semiconductor is formed to improve the performance (e.g., field-effect mobility) of a transistor, the crystalline oxide semiconductor can be easily obtained by heat treatment at 250° C. to 800° C.

Note that a highly purified oxide semiconductor (purified OS) obtained by reduction in impurities such as moisture or hydrogen serving as an electron donor (donor) and by reduction in oxygen defects is an i-type (intrinsic) semiconductor or a substantially i-type semiconductor. Therefore, a transistor including the oxide semiconductor has significantly low off-state current. The bandgap of the oxide semiconductor is 2 eV or more, preferably 2.5 eV or more, more preferably 3 eV or more. With the use of an oxide semiconductor film that is highly purified by sufficiently reducing the concentration of impurities such as moisture or hydrogen and by reducing oxygen defects, the off-state current of the transistor can be reduced.

Unless otherwise specified, in this specification, the off-state current of an n-channel transistor is a current that flows between a source terminal and a drain terminal when the potential of a gate electrode is lower than or equal to 0 with the potential of the source terminal as a reference potential while the potential of the drain terminal is higher than those of the source terminal and the gate electrode. Moreover, in this specification, the off-state current of a p-channel transistor is a current that flows between a source terminal and a drain terminal when the potential of a gate electrode is higher than or equal to 0 with the potential of the source terminal as a reference potential while the potential of the drain terminal is lower than those of the source terminal and the gate electrode.

Various experiments can prove low off-state current of a transistor including a highly purified oxide semiconductor film for a channel formation region. For example, the off-state current of even an element having a channel width of $1\times10^6$ µm and a channel length of 10 µm can be less than or equal to the measurement limit of a semiconductor parameter analyzer, that is, less than or equal to $1\times10^{-13}$ A at a voltage between the source electrode and the drain electrode (a drain voltage) of 1 V to 10 V. In this case, it can be seen that off-state current standardized on the channel width of the transistor is lower than or equal to 100 zA/µm. In addition, the off-state current is measured using a circuit in which a capacitor and a transistor are connected to each other and charge flowing into or from the capacitor is controlled by the transistor. In the measurement, a highly purified oxide semiconductor film is used for a channel formation region of the transistor, and the off-state current of the transistor is measured from a change in the amount of electrical charge of the capacitor per unit time. As a result, it is found that when the voltage between the source electrode and the drain electrode of the transistor is 3 V, a lower off-state current of several tens of yoctoamperes per micrometer (yA/µm) is obtained. Consequently, the transistor in which a highly purified oxide semiconductor film is used for a channel formation region has much lower off-state current than a transistor including crystalline silicon.

An oxide semiconductor preferably contains at least indium (In) or zinc (Zn). Further, as a stabilizer for reducing variations in electric characteristics of transistors using the oxide semiconductor, the oxide semiconductor preferably contains gallium (Ga), tin (Sn), hafnium (Hf), aluminum (Al), and/or zirconium (Zr) in addition to indium (In) and/or zinc (Zn).

As another stabilizer, the oxide semiconductor may contain one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As the oxide semiconductor, any of the following oxides can be used, for example: indium oxide, tin oxide, zinc oxide; two-component metal oxides such as In—Zn-based oxide, Sn—Zn-based oxide, Al—Zn-based oxide, Zn—Mg-based oxide, Sn—Mg-based oxide, In—Mg-based oxide, and In—Ga-based oxide; three-component metal oxides such as In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—La—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, and In—Lu—Zn-based oxide; and four-component metal oxides such as In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

For example, an In—Ga—Zn-based oxide refers to an oxide containing In, Ga, and Zn, and there is no limitation on the composition ratio of In, Ga, and Zn. Further, the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Moreover, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8) or an oxide with an atomic ratio close to the above atomic ratios may be used.

For example, high mobility can be obtained relatively easily in the case of using an In—Sn—Zn-based oxide. However, mobility can be increased by reducing the defect density in a bulk also in the case of using an In—Ga—Zn-based oxide.

An oxide semiconductor film may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor).

An oxide semiconductor film may include a CAAC-OS, for example. In the CAAC-OS, for example, c-axes are aligned, and a-axes and/or b-axes are not macroscopically aligned.

An oxide semiconductor film may include microcrystal, for example. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example. Alternatively, a microcrystalline oxide semiconductor film, for example, includes a crystal-amorphous mixed phase structure where crystal parts (each of which is greater than or equal to 1 nm and less than 10 nm) are distributed.

An oxide semiconductor film may include an amorphous part, for example. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that an oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

Note that an oxide semiconductor film may be in a single-crystal state, for example.

An oxide semiconductor film preferably includes a plurality of crystal parts. In each of the crystal parts, the c-axis is preferably aligned in a direction parallel to a normal vector of a surface where the oxide semiconductor film is formed or a normal vector of a surface of the oxide semiconductor film. Note that among crystal parts, the directions of the a-axis and the b-axis of one crystal part may be different from those of another crystal part. An example of such an oxide semiconductor film is a CAAC-OS film.

The CAAC-OS film is not absolutely amorphous. The CAAC-OS film, for example, includes an oxide semiconductor with a crystal-amorphous mixed phase structure where crystal parts and amorphous parts are intermingled. Note that in most cases, the crystal part fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, the c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that among crystal parts, the directions of the a-axis and the b-axis of one crystal part may be different from those of another crystal part. In this specification, the term "perpendicular" includes a range from 80° to 100°, preferably from 85° to 95°. In addition, the term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is sometimes higher than that in the vicinity of the surface where the oxide semiconductor film is formed. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, a change in electric characteristics due to irradiation with visible light or ultraviolet light is small. Thus, the transistor has high reliability.

For example, the CAAC-OS film is formed by sputtering with a polycrystalline metal oxide target. By collision of ions with the target, a crystal region included in the target may be separated from the target along an a-b plane; in other words, sputtered particles having a plane parallel to the a-b plane (flat-plate-like sputtered particles or pellet-like sputtered particles) may flake off from the target. In this case, the flat-plate-like sputtered particles reach a substrate while maintaining their crystal state, whereby the CAAC-OS film can be formed.

For the deposition of the CAAC-OS film, the following conditions are preferably used.

The crystal state can be prevented from being broken by the impurities by reducing the amount of impurities entering the CAAC-OS film during the deposition, for example, by reducing the concentration of impurities (e.g., hydrogen, water, carbon dioxide, and nitrogen) that exist in the deposition chamber or by reducing the concentration of impurities in a deposition gas. Specifically, a deposition gas with a dew point of −80° C. or lower, preferably −100° C. or lower is used.

By increasing the substrate heating temperature during the deposition, migration of sputtered particles is likely to occur after the sputtered particles reach a substrate surface. Specifically, the substrate heating temperature during the deposition ranges from 100° C. to 740° C., preferably from 200° C. to 500° C. By increasing the substrate heating temperature during the deposition, when the flat-plate-like sputtered particles reach the substrate, migration occurs on the substrate surface, so that a flat plane of the flat-plate-like sputtered particles is attached to the substrate.

It is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the target, an In—Ga—Zn-based oxide target will be described below.

A polycrystalline In—Ga—Zn-based oxide target is made by mixing $InO_X$ powder, $GaO_Y$ powder, and $ZnO_Z$ powder at a predetermined molar ratio, applying pressure to the mixture, and then performing heat treatment on the mixture at temperatures ranging from 1000° C. to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired target.

This embodiment can be implemented in combination with any of the other embodiments as appropriate.

Embodiment 5

The protective circuit, the battery charger, or the power storage device in one embodiment of the present invention can be used for display devices, personal computers, and image reproducing devices provided with recording media (typically, devices that reproduce the content of recording media such as digital versatile discs (DVDs) and have displays for displaying the reproduced images). Other examples of electronic devices that can include the protective circuit, the battery charger, or the power storage device of one embodiment of the present invention are mobile phones, game machines including portable game consoles, portable information terminals, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. FIGS. 11A to 11F illustrate specific examples of these electronic devices.

Figure 11A:
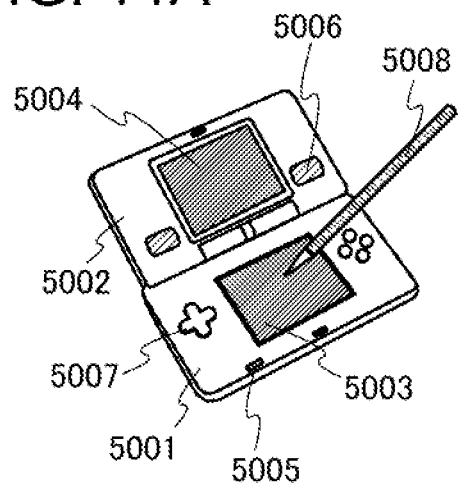
FIGS. 11A to 11F each illustrate an electronic device.

FIG. 11A illustrates a portable game console including a housing 5001, a housing 5002, a display portion 5003, a display portion 5004, a microphone 5005, speakers 5006, operation keys 5007, a stylus 5008, and the like. Note that although the portable game console illustrated in FIG. 11A includes the two display portions 5003 and 5004, the number of display portions included in the portable game console is not limited to two.

Figure 11B:
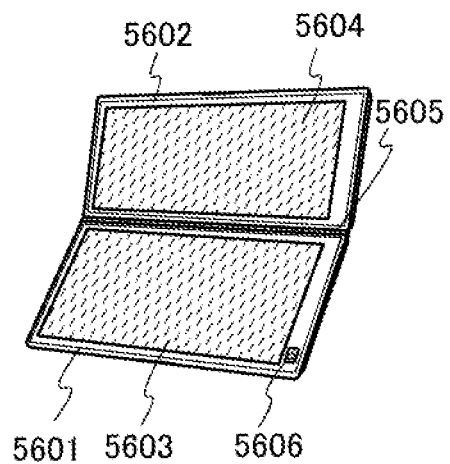

FIG. 11B illustrates a portable information terminal including a first housing 5601, a second housing 5602, a first display portion 5603, a second display portion 5604, a joint 5605, an operation key 5606, and the like. The first display portion 5603 is provided in the first housing 5601, and the second display portion 5604 is provided in the second housing 5602. The first housing 5601 and the second housing 5602 are connected to each other with the joint 5605, and an angle between the first housing 5601 and the second housing 5602 can be changed with the joint 5605. Images displayed on the first display portion 5603 may be switched in accordance with the angle between the first housing 5601 and the second housing 5602 at the joint 5605. A display device with a position input function may be used as at least one of the first display portion 5603 and the second display portion 5604. Note that the position input function can be added by provision of a touch panel in a display device. Alternatively, the position input function can be added by provision of a photoelectric conversion element called a photosensor in a pixel area of a display device.

Figure 11C:
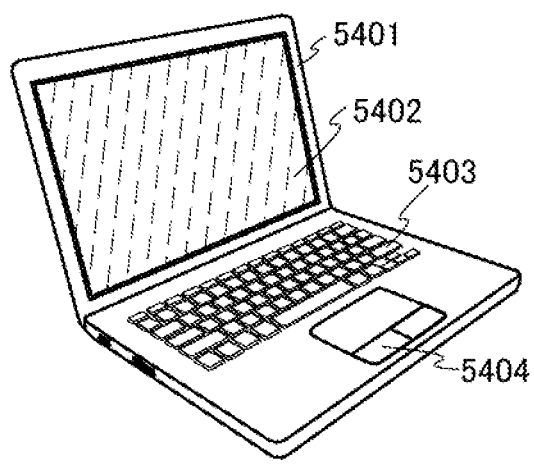

FIG. 11C illustrates a laptop including a housing 5401, a display portion 5402, a keyboard 5403, a pointing device 5404, and the like.

Figure 11D:
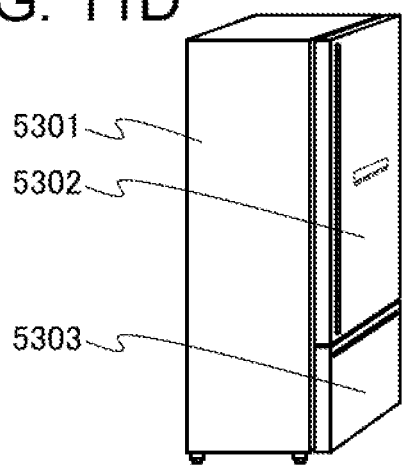

FIG. 11D illustrates an electric refrigerator-freezer including a housing 5301, a refrigerator door 5302, a freezer door 5303, and the like.

Figure 11E:
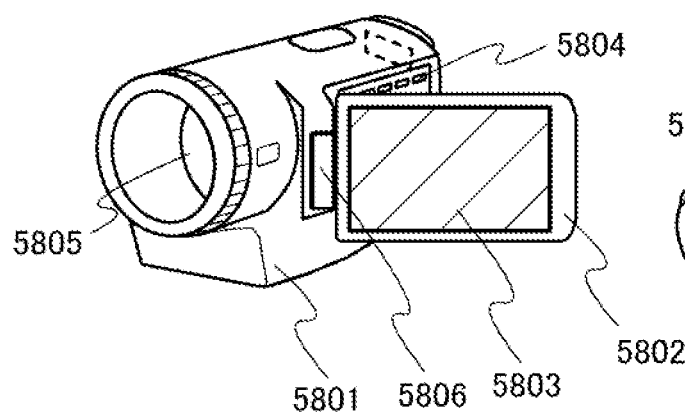

FIG. 11E illustrates a video camera including a first housing 5801, a second housing 5802, a display portion 5803, operation keys 5804, a lens 5805, a joint 5806, and the like. The operation keys 5804 and the lens 5805 are provided in the first housing 5801, and the display portion 5803 is provided in the second housing 5802. The first housing 5801 and the second housing 5802 are connected to each other with the joint 5806, and an angle between the first housing 5801 and the second housing 5802 can be changed with the joint 5806. Images displayed on the display portion 5803 may be switched in accordance with the angle at the joint 5806 between the first housing 5801 and the second housing 5802.

Figure 11F:
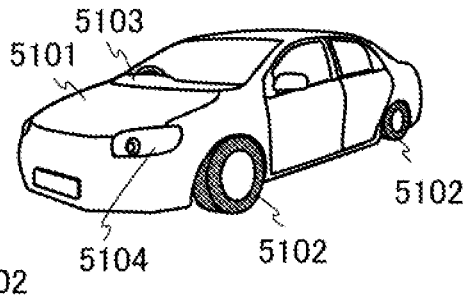

FIG. 11F illustrates a passenger car including a car body 5101, wheels 5102, a dashboard 5103, lights 5104, and the like.

This embodiment can be implemented in combination with any of the other embodiments as appropriate.

This application is based on Japanese Patent Applications serial No. 2012-073411 filed with Japan Patent Office on Mar. 28, 2012, the entire contents of which are hereby incorporated by reference.

What is claimed is:

1. A circuit comprising:
 a detection unit configured to detect a voltage across a battery;
 a battery management unit configured to control charging of the battery based on the voltage supplied from the detection unit, the battery management unit comprising a processor and a buffer memory;
 a first switch unit comprising a first switch between the battery and the processor, and a second switch between the battery and the buffer memory; and
 a first control unit configured to control supply of a power supply voltage from the battery to each of the processor and the buffer memory by turning on or off the first switch and the second switch,
 wherein the first control unit is configured to stop supply of the power supply voltage from the battery to at least one of the processor and the buffer memory when the voltage is not detected by the detection unit.

2. The circuit according to claim 1,
 wherein the detection unit detects the voltage across the battery intermittently.

3. The circuit according to claim 1,
 wherein the battery management unit determines whether the battery needs to be charged or not, based on the voltage supplied from the detection unit and an arithmetic operation performed in the processor with use of the buffer memory.

4. A circuit comprising:
 a detection unit configured to detect a voltage across a battery;
 a battery management unit configured to control charging of the battery based on the voltage supplied from the detection unit, the battery management unit comprising a processor and a buffer memory;
 a first switch unit comprising a first switch between the battery and the processor, and a second switch between the battery and the buffer memory;
 a second switch unit between an external power supply and the battery;
 a first control unit configured to control supply of a power supply voltage from the battery to each of the processor and the buffer memory by turning on or off the first switch and the second switch, and
 a second control unit configured to control supply of a power supply voltage from the external power supply to the battery by turning on or off the second switch unit,
 wherein the first control unit is configured to stop supply of the power supply voltage from the battery to at least one of the processor and the buffer memory when the voltage is not detected by the detection unit,
 wherein the buffer memory comprises a transistor, and
 wherein a channel formation region of the transistor comprises an oxide semiconductor.

5. The circuit according to claim 4,
 wherein the detection unit detects the voltage across the battery intermittently.

6. The circuit according to claim 4,
 wherein the battery management unit determines whether the battery needs to be charged or not, based on the voltage supplied from the detection unit and an arithmetic operation performed in the processor with use of the buffer memory.

7. The circuit according to claim 4, further comprising a host system between the external power supply and the second switch unit.

8. The circuit according to claim 4,
wherein the second switch unit comprises a switch and a diode, and
wherein the first control unit comprises a power controller.

9. The circuit according to claim 4,
wherein the second control unit controls supply of the power supply voltage from the external power supply to the battery in accordance with a determination of the battery management unit.

10. The circuit according to claim 4,
wherein off-state current per micrometer of a channel width of the transistor is 100 zA/μm.

11. The circuit according to claim 4,
wherein the buffer memory comprises a first memory element and a second memory element,
wherein the first memory element is a volatile memory element, and
wherein the second memory element comprises the transistor.

12. The circuit according to claim 4,
wherein the buffer memory comprises a first memory element and a second memory element,
wherein the first memory element is operated by supply of the power supply voltage from the battery, and
wherein the second memory element backs up data stored in the first memory element, before supply of the power supply voltage from the battery is stopped.

13. A power storage device comprising:
a battery;
a detection unit configured to detect a voltage across the battery;
a battery management unit configured to control charging of the battery based on the voltage supplied from the detection unit, the battery management unit comprising a processor and a buffer memory;
a first switch unit comprising a first switch between the battery and the processor, and a second switch between the battery and the buffer memory;
a second switch unit between an external power supply and the battery;
a first control unit configured to control supply of a power supply voltage from the battery to each of the processor and the buffer memory by turning on or off the first switch and the second switch, and
a second control unit configured to control supply of a power supply voltage from the external power supply to the battery by turning on or off the second switch unit,
wherein the first control unit is configured to stop supply of the power supply voltage from the battery to at least one of the processor and the buffer memory when the voltage is not detected by the detection unit,
wherein the buffer memory comprises a transistor, and
wherein a channel formation region of the transistor comprises an oxide semiconductor.

14. The power storage device according to claim 13,
wherein the detection unit detects the voltage across the battery intermittently.

15. The power storage device according to claim 13,
wherein the battery management unit determines whether the battery needs to be charged or not, based on the voltage supplied from the detection unit and an arithmetic operation performed in the processor with use of the buffer memory.

16. The power storage device according to claim 13, further comprising a host system between the external power supply and the second switch unit.

17. The power storage device according to claim 13,
wherein the second switch unit comprises a switch and a diode, and
wherein the first control unit comprises a power controller.

18. The power storage device according to claim 13,
wherein the second control unit controls supply of the power supply voltage from the external power supply to the battery in accordance with a determination of the battery management unit.

19. The power storage device according to claim 13,
wherein off-state current per micrometer of a channel width of the transistor is 100 zA/μm.

20. The power storage device according to claim 13,
wherein the buffer memory comprises a first memory element and a second memory element,
wherein the first memory element is a volatile memory element, and
wherein the second memory element comprises the transistor.

21. The power storage device according to claim 13,
wherein the buffer memory comprises a first memory element and a second memory element,
wherein the first memory element is operated by supply of the power supply voltage from the battery, and
wherein the second memory element backs up data stored in the first memory element, before supply of the power supply voltage from the battery is stopped.

* * * * *